(12) United States Patent
Christensen et al.

(10) Patent No.: US 8,702,248 B1
(45) Date of Patent: Apr. 22, 2014

(54) PROJECTION METHOD FOR REDUCING INTERPIXEL GAPS ON A VIEWING SURFACE

(75) Inventors: Robert R. Christensen, Rapid City, SD (US); Dennis F. Elkins, Draper, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 1350 days.

(21) Appl. No.: 12/483,225

(22) Filed: Jun. 11, 2009

Related U.S. Application Data

(60) Provisional application No. 61/060,744, filed on Jun. 11, 2008.

(51) Int. Cl.
  *G03B 21/28* (2006.01)
(52) U.S. Cl.
  USPC ............... 353/99; 353/30; 353/31; 353/85; 353/94; 353/97; 359/196.1; 359/199.2; 348/744; 348/750
(58) Field of Classification Search
  USPC ............. 353/30, 31, 37, 38, 85, 94, 97, 99; 348/750, 679, 743, 744, E9.027; 349/196.1, 199.2, 201.2, 202.1, 204.2, 349/237, 242, 249, 5, 7–9; 372/22, 26, 28; 359/196.1, 199.2, 201.2, 202.1, 204.2, 359/237, 242, 249
  See application file for complete search history.

(56) References Cited

U.S. PATENT DOCUMENTS

| | | | |
|---|---|---|---|
| 449,435 A | 3/1891 | Brotz | |
| 1,525,550 A | 2/1925 | Jenkins | |
| 1,548,262 A | 8/1925 | Freedman | |
| 1,702,195 A | 2/1929 | Centeno | |
| 1,814,701 A | 7/1931 | Ives | |
| 2,415,226 A | 2/1947 | Sziklai | |
| 2,688,048 A | 8/1954 | Rose | |
| 2,764,628 A | 9/1956 | Bambara | |
| 2,783,406 A | 2/1957 | Vanderhooft | |
| 2,991,690 A | 7/1961 | Grey et al. | |
| 3,201,797 A | 8/1965 | Roth | |

(Continued)

FOREIGN PATENT DOCUMENTS

| | | |
|---|---|---|
| DE | 2 325 028 | 12/1974 |
| DE | 197 21 416 | 1/1999 |

(Continued)

OTHER PUBLICATIONS

Apte, "Grating Light Valves for High-Resolution Displays," Ph.D. Dissertation—Stanford University, 1994 (abstract only).

(Continued)

*Primary Examiner* — Sultan Chowdhury
(74) *Attorney, Agent, or Firm* — Clayton, Howarth & Cannon, P.C.

(57) ABSTRACT

A display system able to reduce interpixel intensity gaps caused by the use of pulsed laser sources having relatively short optimum pulse duration. The interpixel intensity gaps are reduced by temporally offsetting multiple laser pulses for a display pixel during a corresponding pixel-scan period. The temporally offset pulses for the display pixel are then scanned to different locations on a viewing surface such that the display pixel has an improved intensity distribution. Additional reduction in the interpixel gaps may be accomplished by de-focusing the temporally offset pulses in a scan direction, increasing the duty cycle of the source lasers, and shifting the location of alternating frames on the viewing surface.

17 Claims, 18 Drawing Sheets

(56) References Cited

U.S. PATENT DOCUMENTS

| | | |
|---|---|---|
| 3,345,462 A | 10/1967 | Good et al. |
| 3,370,505 A | 2/1968 | Bryan |
| 3,418,459 A | 12/1968 | Purdy et al. |
| 3,422,419 A | 1/1969 | Mathews et al. |
| 3,485,944 A | 12/1969 | Stephens, Jr. |
| 3,534,338 A | 10/1970 | Christensen et al. |
| 3,553,364 A | 1/1971 | Lee |
| 3,576,394 A | 4/1971 | Lee |
| 3,577,031 A | 5/1971 | Welsh et al. |
| 3,600,798 A | 8/1971 | Lee |
| 3,602,702 A | 8/1971 | Warnock |
| 3,605,083 A | 9/1971 | Kramer |
| 3,633,999 A | 1/1972 | Buckles |
| 3,656,837 A | 4/1972 | Sandbank |
| 3,659,920 A | 5/1972 | McGlasson |
| 3,668,622 A | 6/1972 | Gannett et al. |
| 3,688,298 A | 8/1972 | Miller et al. |
| 3,709,581 A | 1/1973 | McGlasson |
| 3,711,826 A | 1/1973 | La Russa |
| 3,734,602 A | 5/1973 | Deck |
| 3,734,605 A | 5/1973 | Yevick |
| 3,736,526 A | 5/1973 | Simmons |
| 3,737,573 A | 6/1973 | Kessler |
| 3,746,911 A | 7/1973 | Nathanson et al. |
| 3,757,161 A | 9/1973 | Kline |
| 3,760,222 A | 9/1973 | Smith |
| 3,764,719 A | 10/1973 | Dell |
| 3,775,760 A | 11/1973 | Strathman |
| 3,781,465 A | 12/1973 | Ernstoff et al. |
| 3,783,184 A | 1/1974 | Ernstoff et al. |
| 3,785,715 A | 1/1974 | Mecklenborg |
| 3,802,769 A | 4/1974 | Rotz et al. |
| 3,816,726 A | 6/1974 | Sutherland et al. |
| 3,818,129 A | 6/1974 | Yamamoto |
| 3,831,106 A | 8/1974 | Ward |
| 3,846,826 A | 11/1974 | Mueller |
| 3,862,360 A | 1/1975 | Dill et al. |
| 3,886,310 A | 5/1975 | Guldberg et al. |
| 3,889,107 A | 6/1975 | Sutherland |
| 3,891,889 A | 6/1975 | Fazio |
| 3,896,338 A | 7/1975 | Nathanson et al. |
| 3,899,662 A | 8/1975 | Kreeger et al. |
| 3,915,548 A | 10/1975 | Opittek et al. |
| 3,920,495 A | 11/1975 | Roberts |
| 3,922,585 A | 11/1975 | Andrews |
| 3,934,173 A | 1/1976 | Korver |
| 3,935,499 A | 1/1976 | Oess |
| 3,940,204 A | 2/1976 | Withrington |
| 3,943,281 A | 3/1976 | Keller et al. |
| 3,947,105 A | 3/1976 | Smith |
| 3,969,611 A | 7/1976 | Fonteneau |
| 3,983,452 A | 9/1976 | Bazin |
| 3,991,416 A | 11/1976 | Byles et al. |
| 4,001,663 A | 1/1977 | Bray |
| 4,009,939 A | 3/1977 | Okano |
| 4,016,658 A | 4/1977 | Porter et al. |
| 4,017,158 A | 4/1977 | Booth |
| 4,017,985 A | 4/1977 | Heartz |
| 4,021,841 A | 5/1977 | Weinger |
| 4,027,403 A | 6/1977 | Marsh et al. |
| 4,028,725 A | 6/1977 | Lewis |
| 4,048,653 A | 9/1977 | Spooner |
| 4,067,129 A | 1/1978 | Abramson et al. |
| 4,077,138 A | 3/1978 | Foerst |
| 4,093,346 A | 6/1978 | Nishino et al. |
| 4,093,347 A | 6/1978 | La Russa |
| 4,100,571 A | 7/1978 | Dykes et al. |
| 4,119,956 A | 10/1978 | Murray |
| 4,120,028 A | 10/1978 | Membrino et al. |
| 4,138,726 A | 2/1979 | Girault et al. |
| 4,139,257 A | 2/1979 | Matsumoto |
| 4,139,799 A | 2/1979 | Kureha et al. |
| 4,149,184 A | 4/1979 | Giddings et al. |
| 4,152,766 A | 5/1979 | Osofsky et al. |
| 4,163,570 A | 8/1979 | Greenaway |
| 4,170,400 A | 10/1979 | Bach et al. |
| 4,177,579 A | 12/1979 | Peters et al. |
| 4,184,700 A | 1/1980 | Greenaway |
| 4,195,911 A | 4/1980 | Bougon et al. |
| 4,197,559 A | 4/1980 | Gramling |
| 4,200,866 A | 4/1980 | Strathman |
| 4,203,051 A | 5/1980 | Hallett et al. |
| 4,211,918 A | 7/1980 | Nyfeler et al. |
| 4,222,106 A | 9/1980 | Hess et al. |
| 4,223,050 A | 9/1980 | Nyfeler et al. |
| 4,229,732 A | 10/1980 | Hartstein et al. |
| 4,234,891 A | 11/1980 | Beck et al. |
| 4,241,519 A | 12/1980 | Gilson et al. |
| 4,250,217 A | 2/1981 | Greenaway |
| 4,250,393 A | 2/1981 | Greenaway |
| 4,289,371 A | 9/1981 | Kramer |
| 4,297,723 A | 10/1981 | Whitby |
| 4,303,394 A | 12/1981 | Berke et al. |
| 4,305,057 A | 12/1981 | Rolston |
| 4,318,173 A | 3/1982 | Freedman et al. |
| 4,333,144 A | 6/1982 | Whiteside et al. |
| 4,335,402 A | 6/1982 | Holmes |
| 4,335,933 A | 6/1982 | Palmer |
| 4,338,661 A | 7/1982 | Tredennick et al. |
| 4,340,878 A | 7/1982 | Spooner et al. |
| 4,342,083 A | 7/1982 | Freedman et al. |
| 4,343,037 A | 8/1982 | Bolton |
| 4,343,532 A | 8/1982 | Palmer |
| 4,345,817 A | 8/1982 | Gwynn |
| 4,347,507 A | 8/1982 | Spooner |
| 4,348,184 A | 9/1982 | Moore |
| 4,348,185 A | 9/1982 | Breglia et al. |
| 4,348,186 A | 9/1982 | Harvey et al. |
| 4,349,815 A | 9/1982 | Spooner |
| 4,356,730 A | 11/1982 | Cade |
| 4,360,884 A | 11/1982 | Okada et al. |
| 4,375,685 A | 3/1983 | Le Goff et al. |
| 4,384,324 A | 5/1983 | Kim et al. |
| 4,390,253 A | 6/1983 | Lobb |
| 4,393,394 A | 7/1983 | McCoy |
| 4,394,727 A | 7/1983 | Hoffman et al. |
| 4,398,794 A | 8/1983 | Palmer et al. |
| 4,398,795 A | 8/1983 | Palmer |
| 4,399,861 A | 8/1983 | Carlson |
| 4,408,884 A | 10/1983 | Kleinknecht et al. |
| 4,422,019 A | 12/1983 | Meyer |
| 4,427,274 A | 1/1984 | Pund et al. |
| 4,431,260 A | 2/1984 | Palmer |
| 4,435,756 A | 3/1984 | Potash |
| 4,437,113 A | 3/1984 | Lee et al. |
| 4,439,157 A | 3/1984 | Breglia et al. |
| 4,440,839 A | 4/1984 | Mottier |
| 4,441,791 A | 4/1984 | Hornbeck |
| 4,445,197 A | 4/1984 | Lorie et al. |
| 4,446,480 A | 5/1984 | Breglia et al. |
| 4,463,372 A | 7/1984 | Bennett et al. |
| 4,466,123 A | 8/1984 | Arai et al. |
| 4,471,433 A | 9/1984 | Matsumoto et al. |
| 4,472,732 A | 9/1984 | Bennett et al. |
| 4,487,584 A | 12/1984 | Allen et al. |
| 4,492,435 A | 1/1985 | Banton et al. |
| 4,498,136 A | 2/1985 | Sproul, III |
| 4,499,457 A | 2/1985 | Hintze |
| 4,500,163 A | 2/1985 | Burns et al. |
| 4,511,337 A | 4/1985 | Fortunato et al. |
| 4,536,058 A | 8/1985 | Shaw et al. |
| 4,539,638 A | 9/1985 | Gaffney |
| 4,546,431 A | 10/1985 | Horvath |
| 4,566,935 A | 1/1986 | Hornbeck |
| 4,570,233 A | 2/1986 | Yan et al. |
| 4,582,396 A | 4/1986 | Bos et al. |
| 4,583,185 A | 4/1986 | Heartz |
| 4,586,037 A | 4/1986 | Rosener et al. |
| 4,586,038 A | 4/1986 | Sims et al. |
| 4,589,093 A | 5/1986 | Ippolito et al. |
| 4,590,555 A | 5/1986 | Bourrez |
| 4,591,844 A | 5/1986 | Hickin et al. |
| 4,596,992 A | 6/1986 | Hornbeck |
| 4,597,633 A | 7/1986 | Fussell |

(56) References Cited

U.S. PATENT DOCUMENTS

| | | |
|---|---|---|
| 4,598,372 A | 7/1986 | McRoberts |
| 4,599,070 A | 7/1986 | Hladky et al. |
| 4,609,939 A | 9/1986 | Kozawa et al. |
| 4,616,217 A | 10/1986 | Nesbitt et al. |
| 4,616,262 A | 10/1986 | Toriumi et al. |
| 4,623,223 A | 11/1986 | Kempf |
| 4,623,880 A | 11/1986 | Bresenham et al. |
| 4,625,289 A | 11/1986 | Rockwood |
| 4,630,101 A | 12/1986 | Inaba et al. |
| 4,630,884 A | 12/1986 | Jubinski |
| 4,631,690 A | 12/1986 | Corthout et al. |
| 4,633,243 A | 12/1986 | Bresenham et al. |
| 4,634,384 A | 1/1987 | Neves et al. |
| 4,636,031 A | 1/1987 | Schmadel, Jr. et al. |
| 4,636,384 A | 1/1987 | Stolle et al. |
| 4,642,756 A | 2/1987 | Sherrod |
| 4,642,790 A | 2/1987 | Minshull et al. |
| 4,642,945 A | 2/1987 | Browning et al. |
| 4,645,459 A | 2/1987 | Graf et al. |
| 4,646,251 A | 2/1987 | Hayes et al. |
| 4,647,966 A | 3/1987 | Phillips et al. |
| 4,655,539 A | 4/1987 | Caulfield et al. |
| 4,656,506 A | 4/1987 | Ritchey |
| 4,656,578 A | 4/1987 | Chilinski et al. |
| 4,657,512 A | 4/1987 | Mecklenborg |
| 4,658,351 A | 4/1987 | Teng |
| 4,662,746 A | 5/1987 | Hornbeck |
| 4,663,617 A | 5/1987 | Stockwell |
| 4,671,650 A | 6/1987 | Hirzel et al. |
| 4,672,215 A | 6/1987 | Howard |
| 4,672,275 A | 6/1987 | Ando |
| 4,677,576 A | 6/1987 | Berlin, Jr. et al. |
| 4,679,040 A | 7/1987 | Yan |
| 4,684,215 A | 8/1987 | Shaw et al. |
| 4,692,880 A | 9/1987 | Merz et al. |
| 4,698,602 A | 10/1987 | Armitage |
| 4,704,605 A | 11/1987 | Edelson |
| 4,710,732 A | 12/1987 | Hornbeck |
| 4,714,428 A | 12/1987 | Bunker et al. |
| 4,715,005 A | 12/1987 | Heartz |
| 4,720,705 A | 1/1988 | Gupta et al. |
| 4,720,747 A | 1/1988 | Crowley |
| 4,725,110 A | 2/1988 | Glenn et al. |
| 4,727,365 A | 2/1988 | Bunker et al. |
| 4,730,261 A | 3/1988 | Smith |
| 4,731,859 A | 3/1988 | Holter et al. |
| 4,735,410 A | 4/1988 | Nobuta |
| 4,743,200 A | 5/1988 | Welch et al. |
| 4,744,615 A | 5/1988 | Fan et al. |
| 4,748,572 A | 5/1988 | Latham |
| 4,751,509 A | 6/1988 | Kubota et al. |
| 4,760,388 A | 7/1988 | Tatsumi et al. |
| 4,760,917 A | 8/1988 | Vitek |
| 4,761,253 A | 8/1988 | Antes |
| 4,763,280 A | 8/1988 | Robinson et al. |
| 4,766,555 A | 8/1988 | Bennett |
| 4,769,762 A | 9/1988 | Tsujido |
| 4,772,881 A | 9/1988 | Hannah |
| 4,777,620 A | 10/1988 | Shimoni et al. |
| 4,780,084 A | 10/1988 | Donovan |
| 4,780,711 A | 10/1988 | Doumas |
| 4,791,583 A | 12/1988 | Colburn |
| 4,794,386 A | 12/1988 | Bedrij et al. |
| 4,795,226 A | 1/1989 | Bennion et al. |
| 4,796,020 A | 1/1989 | Budrikis et al. |
| 4,799,106 A | 1/1989 | Moore et al. |
| 4,805,107 A | 2/1989 | Kieckhafer et al. |
| 4,807,158 A | 2/1989 | Blanton et al. |
| 4,807,183 A | 2/1989 | Kung et al. |
| 4,811,245 A | 3/1989 | Bunker et al. |
| 4,812,988 A | 3/1989 | Duthuit et al. |
| 4,821,212 A | 4/1989 | Heartz |
| 4,825,391 A | 4/1989 | Merz |
| 4,833,528 A | 5/1989 | Kobayashi |
| 4,837,740 A | 6/1989 | Sutherland |
| 4,854,669 A | 8/1989 | Birnbach et al. |
| 4,855,934 A | 8/1989 | Robinson |
| 4,855,937 A | 8/1989 | Heartz |
| 4,855,939 A | 8/1989 | Fitzgerald, Jr. et al. |
| 4,855,943 A | 8/1989 | Lewis |
| 4,856,869 A | 8/1989 | Sakata et al. |
| 4,868,766 A | 9/1989 | Oosterholt |
| 4,868,771 A | 9/1989 | Quick et al. |
| 4,873,515 A | 10/1989 | Dickson et al. |
| 4,884,275 A | 11/1989 | Simms |
| 4,885,703 A | 12/1989 | Deering |
| 4,893,353 A | 1/1990 | Iwaoka et al. |
| 4,893,515 A | 1/1990 | Uchida |
| 4,897,715 A | 1/1990 | Beamon, III |
| 4,899,293 A | 2/1990 | Dawson et al. |
| 4,907,237 A | 3/1990 | Dahmani et al. |
| 4,912,526 A | 3/1990 | Iwaoka et al. |
| 4,915,463 A | 4/1990 | Barbee, Jr. |
| 4,918,626 A | 4/1990 | Watkins et al. |
| 4,930,888 A | 6/1990 | Freisleben et al. |
| 4,935,879 A | 6/1990 | Ueda |
| 4,938,584 A | 7/1990 | Suematsu et al. |
| 4,940,972 A | 7/1990 | Mouchot et al. |
| 4,949,280 A | 8/1990 | Littlefield |
| 4,952,152 A | 8/1990 | Briggs et al. |
| 4,952,922 A | 8/1990 | Griffin et al. |
| 4,953,107 A | 8/1990 | Hedley et al. |
| 4,954,819 A | 9/1990 | Watkins |
| 4,955,034 A | 9/1990 | Scerbak |
| 4,959,541 A | 9/1990 | Boyd |
| 4,959,803 A | 9/1990 | Kiyohara et al. |
| 4,969,714 A | 11/1990 | Fournier, Jr. et al. |
| 4,970,500 A | 11/1990 | Hintze |
| 4,974,155 A | 11/1990 | Dulong et al. |
| 4,974,176 A | 11/1990 | Buchner et al. |
| 4,982,178 A | 1/1991 | Hintze |
| 4,984,824 A | 1/1991 | Antes et al. |
| 4,985,831 A | 1/1991 | Dulong et al. |
| 4,985,854 A | 1/1991 | Wittenburg |
| 4,991,955 A | 2/1991 | Vetter |
| 4,992,780 A | 2/1991 | Penna et al. |
| 4,994,794 A | 2/1991 | Price et al. |
| 5,005,005 A | 4/1991 | Brossia et al. |
| 5,007,705 A | 4/1991 | Morey et al. |
| 5,011,276 A | 4/1991 | Iwamoto |
| 5,016,643 A | 5/1991 | Applegate et al. |
| 5,022,732 A | 6/1991 | Engan et al. |
| 5,022,750 A | 6/1991 | Flasck |
| 5,023,725 A | 6/1991 | McCutchen |
| 5,023,818 A | 6/1991 | Wittensoldner et al. |
| 5,025,394 A | 6/1991 | Parke |
| 5,025,400 A | 6/1991 | Cook et al. |
| 5,035,473 A | 7/1991 | Kuwayama et al. |
| 5,038,352 A | 8/1991 | Lenth et al. |
| 5,043,924 A | 8/1991 | Hofmann |
| 5,047,626 A | 9/1991 | Bobb et al. |
| 5,053,698 A | 10/1991 | Ueda |
| 5,058,992 A | 10/1991 | Takahashi |
| 5,059,019 A | 10/1991 | McCullough |
| 5,061,075 A | 10/1991 | Alfano et al. |
| 5,061,919 A | 10/1991 | Watkins |
| 5,063,375 A | 11/1991 | Lien et al. |
| 5,077,608 A | 12/1991 | Dubner |
| 5,088,095 A | 2/1992 | Zirngibl |
| 5,089,903 A | 2/1992 | Kuwayama et al. |
| 5,095,491 A | 3/1992 | Kozlovsky et al. |
| 5,097,427 A | 3/1992 | Lathrop et al. |
| 5,101,184 A | 3/1992 | Antes |
| 5,103,306 A | 4/1992 | Weiman et al. |
| 5,103,339 A | 4/1992 | Broome |
| 5,111,468 A | 5/1992 | Kozlovsky et al. |
| 5,113,455 A | 5/1992 | Scott |
| 5,115,127 A | 5/1992 | Bobb et al. |
| 5,117,221 A | 5/1992 | Mishica, Jr. |
| RE33,973 E | 6/1992 | Kriz et al. |
| 5,121,086 A | 6/1992 | Srivastava |
| 5,123,085 A | 6/1992 | Wells et al. |
| 5,124,821 A | 6/1992 | Antier et al. |
| 5,132,812 A | 7/1992 | Takahashi et al. |

(56) References Cited

U.S. PATENT DOCUMENTS

| | | |
|---|---|---|
| 5,134,521 A | 7/1992 | Lacroix et al. |
| 5,136,675 A | 8/1992 | Hodson |
| 5,136,818 A | 8/1992 | Bramson |
| 5,142,788 A | 9/1992 | Willetts |
| 5,155,604 A | 10/1992 | Miekka et al. |
| 5,157,385 A | 10/1992 | Nakao et al. |
| 5,159,601 A | 10/1992 | Huber |
| 5,161,013 A | 11/1992 | Rylander et al. |
| 5,175,575 A | 12/1992 | Gersuk |
| 5,179,638 A | 1/1993 | Dawson et al. |
| 5,185,852 A | 2/1993 | Mayer |
| 5,194,969 A | 3/1993 | DiFrancesco |
| 5,196,922 A | 3/1993 | Yeomans |
| 5,198,661 A | 3/1993 | Anderson et al. |
| 5,200,818 A | 4/1993 | Neta et al. |
| 5,206,868 A | 4/1993 | Deacon |
| 5,214,757 A | 5/1993 | Mauney et al. |
| 5,222,205 A | 6/1993 | Larson et al. |
| 5,226,109 A | 7/1993 | Dawson et al. |
| 5,227,863 A | 7/1993 | Bilbrey et al. |
| 5,229,593 A | 7/1993 | Cato |
| 5,230,039 A | 7/1993 | Grossman et al. |
| 5,231,388 A | 7/1993 | Stoltz |
| 5,239,625 A | 8/1993 | Bogart et al. |
| 5,241,659 A | 8/1993 | Parulski et al. |
| 5,242,306 A | 9/1993 | Fisher |
| 5,243,448 A | 9/1993 | Banbury |
| 5,251,160 A | 10/1993 | Rockwood et al. |
| 5,252,068 A | 10/1993 | Gryder |
| 5,255,274 A | 10/1993 | Wysocki et al. |
| 5,266,930 A | 11/1993 | Ichikawa et al. |
| 5,267,045 A | 11/1993 | Stroomer |
| 5,272,473 A | 12/1993 | Thompson et al. |
| 5,276,849 A | 1/1994 | Patel |
| 5,285,397 A | 2/1994 | Heier et al. |
| 5,291,317 A | 3/1994 | Newswanger |
| 5,293,233 A | 3/1994 | Billing et al. |
| 5,297,156 A | 3/1994 | Deacon |
| 5,300,942 A | 4/1994 | Dolgoff |
| 5,301,062 A | 4/1994 | Takahashi et al. |
| 5,311,360 A | 5/1994 | Bloom et al. |
| 5,315,699 A | 5/1994 | Imai et al. |
| 5,317,576 A | 5/1994 | Leonberger et al. |
| 5,317,689 A | 5/1994 | Nack et al. |
| 5,319,744 A | 6/1994 | Kelly et al. |
| 5,320,353 A | 6/1994 | Moore |
| 5,320,534 A | 6/1994 | Thomas |
| 5,325,133 A | 6/1994 | Adachi |
| 5,325,485 A | 6/1994 | Hochmuth et al. |
| 5,326,266 A | 7/1994 | Fisher et al. |
| 5,329,323 A | 7/1994 | Biles |
| 5,333,021 A | 7/1994 | Mitsutake et al. |
| 5,333,245 A | 7/1994 | Vecchione |
| 5,341,460 A | 8/1994 | Tam |
| 5,345,280 A | 9/1994 | Kimura et al. |
| 5,347,433 A | 9/1994 | Sedlmayr |
| 5,347,620 A | 9/1994 | Zimmer |
| 5,348,477 A | 9/1994 | Welch et al. |
| 5,353,390 A | 10/1994 | Harrington |
| 5,357,579 A | 10/1994 | Buchner et al. |
| 5,359,526 A | 10/1994 | Whittington et al. |
| 5,359,704 A | 10/1994 | Rossignac et al. |
| 5,360,010 A | 11/1994 | Applegate et al. |
| 5,361,386 A | 11/1994 | Watkins et al. |
| 5,363,220 A | 11/1994 | Kuwayama et al. |
| 5,363,475 A | 11/1994 | Baker et al. |
| 5,363,476 A | 11/1994 | Kurashige et al. |
| 5,367,585 A | 11/1994 | Ghezzo et al. |
| 5,367,615 A | 11/1994 | Economy et al. |
| 5,369,450 A | 11/1994 | Haseltine et al. |
| 5,369,735 A | 11/1994 | Thier et al. |
| 5,369,739 A | 11/1994 | Akeley |
| 5,377,320 A | 12/1994 | Abi-Ezzi et al. |
| 5,379,371 A | 1/1995 | Usami et al. |
| 5,380,995 A | 1/1995 | Udd et al. |
| 5,381,338 A | 1/1995 | Wysocki et al. |
| 5,381,519 A | 1/1995 | Brown et al. |
| 5,384,719 A | 1/1995 | Baker et al. |
| 5,388,206 A | 2/1995 | Poulton et al. |
| 5,394,414 A | 2/1995 | Kozlovsky et al. |
| 5,394,515 A | 2/1995 | Lentz et al. |
| 5,394,516 A | 2/1995 | Winser |
| 5,396,349 A | 3/1995 | Roberts et al. |
| 5,398,083 A | 3/1995 | Tsujihara et al. |
| 5,408,249 A | 4/1995 | Wharton et al. |
| 5,408,606 A | 4/1995 | Eckart |
| 5,410,371 A | 4/1995 | Lambert |
| 5,412,796 A | 5/1995 | Olive |
| 5,422,986 A | 6/1995 | Neely |
| 5,430,888 A | 7/1995 | Witek et al. |
| 5,432,863 A | 7/1995 | Benati et al. |
| 5,444,839 A | 8/1995 | Silverbrook et al. |
| 5,451,765 A | 9/1995 | Gerber |
| 5,459,610 A | 10/1995 | Bloom et al. |
| 5,459,835 A | 10/1995 | Trevett |
| 5,465,121 A | 11/1995 | Blalock et al. |
| 5,465,368 A | 11/1995 | Davidson et al. |
| 5,471,545 A | 11/1995 | Negami et al. |
| 5,471,567 A | 11/1995 | Soderberg et al. |
| 5,473,373 A | 12/1995 | Hwung et al. |
| 5,473,391 A | 12/1995 | Usui |
| 5,479,597 A | 12/1995 | Fellous |
| 5,480,305 A | 1/1996 | Montag et al. |
| 5,487,665 A | 1/1996 | Lechner et al. |
| 5,488,687 A | 1/1996 | Rich |
| 5,489,920 A | 2/1996 | Kaasila |
| 5,490,238 A | 2/1996 | Watkins |
| 5,490,240 A | 2/1996 | Foran et al. |
| 5,493,439 A | 2/1996 | Engle |
| 5,493,629 A | 2/1996 | Stange |
| 5,495,563 A | 2/1996 | Winser |
| 5,499,194 A | 3/1996 | Prestidge et al. |
| 5,500,747 A | 3/1996 | Tanide et al. |
| 5,500,761 A | 3/1996 | Goossen et al. |
| 5,502,482 A | 3/1996 | Graham |
| 5,502,782 A | 3/1996 | Smith |
| 5,504,496 A | 4/1996 | Tanaka et al. |
| 5,506,949 A | 4/1996 | Perrin |
| 5,519,518 A | 5/1996 | Watanabe et al. |
| 5,535,374 A | 7/1996 | Olive |
| 5,536,085 A | 7/1996 | Li et al. |
| 5,537,159 A | 7/1996 | Suematsu et al. |
| 5,539,577 A | 7/1996 | Si et al. |
| 5,541,769 A | 7/1996 | Ansley et al. |
| 5,544,306 A | 8/1996 | Deering et al. |
| 5,544,340 A | 8/1996 | Doi et al. |
| 5,550,960 A | 8/1996 | Shirman et al. |
| 5,551,283 A | 9/1996 | Manaka et al. |
| 5,557,297 A | 9/1996 | Sharp et al. |
| 5,557,733 A | 9/1996 | Hicok et al. |
| 5,559,952 A | 9/1996 | Fujimoto |
| 5,559,954 A | 9/1996 | Sakoda et al. |
| 5,561,745 A | 10/1996 | Jackson et al. |
| 5,566,370 A | 10/1996 | Young |
| 5,572,229 A | 11/1996 | Fisher |
| 5,574,847 A | 11/1996 | Eckart et al. |
| 5,579,456 A | 11/1996 | Cosman |
| 5,584,696 A | 12/1996 | Walker et al. |
| 5,586,291 A | 12/1996 | Lasker et al. |
| 5,590,254 A | 12/1996 | Lippincott et al. |
| 5,594,854 A | 1/1997 | Baldwin et al. |
| 5,598,517 A | 1/1997 | Watkins |
| 5,604,849 A | 2/1997 | Artwick et al. |
| 5,610,665 A | 3/1997 | Berman et al. |
| 5,612,710 A | 3/1997 | Christensen et al. |
| 5,614,961 A | 3/1997 | Gibeau et al. |
| 5,625,768 A | 4/1997 | Dye |
| 5,627,605 A | 5/1997 | Kim |
| 5,629,801 A | 5/1997 | Staker et al. |
| 5,630,037 A | 5/1997 | Schindler |
| 5,633,750 A | 5/1997 | Nogiwa et al. |
| 5,638,208 A | 6/1997 | Walker |
| 5,648,860 A | 7/1997 | Ooi et al. |
| 5,650,814 A | 7/1997 | Florent et al. |

(56) References Cited

U.S. PATENT DOCUMENTS

| | | |
|---|---|---|
| 5,651,104 A | 7/1997 | Cosman |
| 5,657,077 A | 8/1997 | DeAngelis et al. |
| 5,658,060 A | 8/1997 | Dove |
| 5,659,490 A | 8/1997 | Imamura |
| 5,659,671 A | 8/1997 | Tannenbaum et al. |
| 5,661,592 A | 8/1997 | Bornstein et al. |
| 5,661,593 A | 8/1997 | Engle |
| 5,665,942 A | 9/1997 | Williams et al. |
| 5,677,783 A | 10/1997 | Bloom et al. |
| 5,684,939 A | 11/1997 | Foran et al. |
| 5,684,943 A | 11/1997 | Abraham et al. |
| 5,689,437 A | 11/1997 | Nakagawa |
| 5,691,999 A | 11/1997 | Ball et al. |
| 5,694,180 A | 12/1997 | Deter et al. |
| 5,696,892 A | 12/1997 | Redmann et al. |
| 5,696,947 A | 12/1997 | Johns et al. |
| 5,699,497 A | 12/1997 | Erdahl et al. |
| 5,703,604 A | 12/1997 | McCutchen |
| 5,706,061 A | 1/1998 | Marshall et al. |
| 5,715,021 A | 2/1998 | Gibeau et al. |
| 5,719,951 A | 2/1998 | Shackleton et al. |
| 5,724,561 A | 3/1998 | Tarolli et al. |
| 5,726,785 A | 3/1998 | Chawki et al. |
| 5,734,386 A | 3/1998 | Cosman |
| 5,734,521 A | 3/1998 | Fukudome et al. |
| 5,739,819 A | 4/1998 | Bar-Nahum |
| 5,740,190 A | 4/1998 | Moulton |
| 5,742,749 A | 4/1998 | Foran et al. |
| 5,748,264 A | 5/1998 | Hegg |
| 5,748,867 A | 5/1998 | Cosman et al. |
| 5,761,709 A | 6/1998 | Kranich |
| 5,764,280 A | 6/1998 | Bloom et al. |
| 5,764,311 A | 6/1998 | Bonde et al. |
| 5,768,443 A | 6/1998 | Michael et al. |
| 5,781,666 A | 7/1998 | Ishizawa et al. |
| 5,793,912 A | 8/1998 | Boord et al. |
| 5,798,743 A | 8/1998 | Bloom |
| 5,808,797 A | 9/1998 | Bloom et al. |
| 5,818,456 A | 10/1998 | Cosman et al. |
| 5,818,998 A | 10/1998 | Harris et al. |
| 5,821,944 A | 10/1998 | Watkins |
| 5,825,363 A | 10/1998 | Anderson |
| 5,825,538 A | 10/1998 | Walker |
| 5,835,256 A | 11/1998 | Huibers |
| 5,837,996 A | 11/1998 | Keydar |
| 5,838,328 A | 11/1998 | Roller |
| 5,838,484 A | 11/1998 | Goossen |
| 5,841,443 A | 11/1998 | Einkauf |
| 5,841,447 A | 11/1998 | Drews |
| 5,841,579 A | 11/1998 | Bloom et al. |
| 5,850,225 A | 12/1998 | Cosman |
| 5,854,631 A | 12/1998 | Akeley et al. |
| 5,854,865 A | 12/1998 | Goldberg |
| 5,860,721 A | 1/1999 | Bowron et al. |
| 5,864,342 A | 1/1999 | Kajiya et al. |
| 5,867,166 A | 2/1999 | Myhrvold et al. |
| 5,867,301 A | 2/1999 | Engle |
| 5,870,097 A | 2/1999 | Snyder et al. |
| 5,870,098 A | 2/1999 | Gardiner |
| 5,874,967 A | 2/1999 | West et al. |
| 5,889,529 A | 3/1999 | Jones et al. |
| 5,900,881 A | 5/1999 | Ikedo |
| 5,903,272 A | 5/1999 | Otto |
| 5,905,504 A | 5/1999 | Barkans et al. |
| 5,908,300 A | 6/1999 | Walker et al. |
| 5,909,225 A | 6/1999 | Schinnerer et al. |
| 5,912,670 A | 6/1999 | Lipscomb et al. |
| 5,912,740 A | 6/1999 | Zare et al. |
| 5,917,495 A | 6/1999 | Doi et al. |
| 5,920,361 A | 7/1999 | Gibeau et al. |
| 5,923,333 A | 7/1999 | Stroyan |
| 5,930,740 A | 7/1999 | Mathisen |
| 5,943,060 A | 8/1999 | Cosman et al. |
| 5,946,129 A | 8/1999 | Xu et al. |
| 5,963,788 A | 10/1999 | Barron et al. |
| 5,969,699 A | 10/1999 | Balram et al. |
| 5,969,721 A | 10/1999 | Chen et al. |
| 5,969,726 A | 10/1999 | Rentschler et al. |
| 5,974,059 A | 10/1999 | Dawson |
| 5,977,977 A | 11/1999 | Kajiya et al. |
| 5,980,044 A | 11/1999 | Cannon et al. |
| 5,982,553 A | 11/1999 | Bloom et al. |
| 5,987,200 A | 11/1999 | Fleming et al. |
| 5,988,814 A | 11/1999 | Rohlfing et al. |
| 5,990,935 A | 11/1999 | Rohlfing |
| 5,999,549 A | 12/1999 | Freitag et al. |
| 6,002,454 A | 12/1999 | Kajiwara et al. |
| 6,002,505 A | 12/1999 | Kraenert et al. |
| 6,005,580 A | 12/1999 | Donovan |
| 6,005,611 A | 12/1999 | Gullichsen et al. |
| 6,014,144 A | 1/2000 | Nelson et al. |
| 6,014,163 A | 1/2000 | Houskeeper |
| 6,021,141 A | 2/2000 | Nam et al. |
| 6,031,541 A | 2/2000 | Lipscomb et al. |
| 6,034,739 A | 3/2000 | Rohlfing et al. |
| 6,038,057 A | 3/2000 | Brazas, Jr. et al. |
| 6,042,238 A | 3/2000 | Blackham et al. |
| 6,052,125 A | 4/2000 | Gardiner et al. |
| 6,052,485 A | 4/2000 | Nelson et al. |
| 6,057,909 A | 5/2000 | Yahav et al. |
| 6,064,392 A | 5/2000 | Rohner |
| 6,064,393 A | 5/2000 | Lengyel et al. |
| 6,069,903 A | 5/2000 | Zanger et al. |
| 6,072,500 A | 6/2000 | Foran et al. |
| 6,072,544 A | 6/2000 | Gleim et al. |
| 6,078,333 A | 6/2000 | Wittig et al. |
| 6,084,610 A | 7/2000 | Ozaki et al. |
| 6,094,226 A | 7/2000 | Ke et al. |
| 6,094,267 A | 7/2000 | Levenson et al. |
| 6,094,298 A | 7/2000 | Luo et al. |
| 6,100,906 A | 8/2000 | Asaro et al. |
| 6,101,036 A | 8/2000 | Bloom |
| 6,108,054 A | 8/2000 | Heizmann et al. |
| 6,111,616 A | 8/2000 | Chauvin et al. |
| 6,122,413 A | 9/2000 | Jiang et al. |
| 6,124,647 A | 9/2000 | Marcus et al. |
| 6,124,808 A | 9/2000 | Budnovitch |
| 6,124,922 A | 9/2000 | Sentoku |
| 6,124,989 A | 9/2000 | Oode et al. |
| 6,126,288 A | 10/2000 | Hewlett |
| 6,128,019 A | 10/2000 | Crocker, III et al. |
| 6,128,021 A | 10/2000 | van der Meulen et al. |
| 6,130,770 A | 10/2000 | Bloom |
| 6,134,339 A | 10/2000 | Luo |
| 6,137,565 A | 10/2000 | Ecke et al. |
| 6,137,932 A | 10/2000 | Kim et al. |
| 6,141,013 A | 10/2000 | Nelson et al. |
| 6,141,025 A | 10/2000 | Oka et al. |
| 6,141,034 A | 10/2000 | McCutchen |
| 6,144,481 A | 11/2000 | Kowarz et al. |
| 6,147,690 A | 11/2000 | Cosman |
| 6,147,695 A | 11/2000 | Bowen et al. |
| 6,147,789 A | 11/2000 | Gelbart |
| 6,154,259 A | 11/2000 | Hargis et al. |
| 6,175,579 B1 | 1/2001 | Sandford et al. |
| 6,184,888 B1 | 2/2001 | Yuasa et al. |
| 6,184,891 B1 | 2/2001 | Blinn |
| 6,184,926 B1 | 2/2001 | Khosravi et al. |
| 6,188,427 B1 | 2/2001 | Anderson et al. |
| 6,188,712 B1 | 2/2001 | Jiang et al. |
| 6,191,827 B1 | 2/2001 | Segman et al. |
| 6,195,099 B1 | 2/2001 | Gardiner |
| 6,195,484 B1 | 2/2001 | Brennan, III et al. |
| 6,195,609 B1 | 2/2001 | Pilley et al. |
| 6,204,859 B1 | 3/2001 | Jouppi et al. |
| 6,204,955 B1 | 3/2001 | Chao et al. |
| 6,215,579 B1 | 4/2001 | Bloom et al. |
| 6,219,015 B1 | 4/2001 | Bloom et al. |
| 6,222,937 B1 | 4/2001 | Cohen et al. |
| 6,229,650 B1 | 5/2001 | Reznichenko et al. |
| 6,229,827 B1 | 5/2001 | Fernald et al. |
| 6,233,025 B1 | 5/2001 | Wallenstein |
| 6,236,408 B1 | 5/2001 | Watkins |
| 6,240,220 B1 | 5/2001 | Pan et al. |

(56) References Cited

U.S. PATENT DOCUMENTS

| | | |
|---|---|---|
| 6,262,739 B1 | 7/2001 | Migdal et al. |
| 6,262,810 B1 | 7/2001 | Bloomer |
| 6,263,002 B1 | 7/2001 | Hsu et al. |
| 6,266,068 B1 | 7/2001 | Kang et al. |
| 6,268,861 B1 | 7/2001 | Sanz-Pastor et al. |
| 6,282,012 B1 | 8/2001 | Kowarz et al. |
| 6,282,220 B1 | 8/2001 | Floyd |
| 6,285,407 B1 | 9/2001 | Yasuki et al. |
| 6,285,446 B1 | 9/2001 | Farhadiroushan |
| 6,292,165 B1 | 9/2001 | Lin et al. |
| 6,292,268 B1 | 9/2001 | Hirota et al. |
| 6,292,310 B1 | 9/2001 | Chao |
| 6,297,899 B1 | 10/2001 | Romanovsky |
| 6,298,066 B1 | 10/2001 | Wettroth et al. |
| 6,301,370 B1 | 10/2001 | Steffens et al. |
| 6,304,245 B1 | 10/2001 | Groenenboom |
| 6,307,558 B1 | 10/2001 | Mao |
| 6,307,663 B1 | 10/2001 | Kowarz |
| 6,308,144 B1 | 10/2001 | Bronfeld et al. |
| 6,320,688 B1 | 11/2001 | Westbrook et al. |
| 6,323,984 B1 | 11/2001 | Trisnadi |
| 6,333,792 B1 | 12/2001 | Kimura |
| 6,333,803 B1 | 12/2001 | Kurotori et al. |
| 6,335,765 B1 | 1/2002 | Daly et al. |
| 6,335,941 B1 | 1/2002 | Grubb et al. |
| 6,340,806 B1 | 1/2002 | Smart et al. |
| 6,356,683 B1 | 3/2002 | Hu et al. |
| 6,360,042 B1 | 3/2002 | Long |
| 6,361,173 B1 | 3/2002 | Vlahos et al. |
| 6,362,817 B1 | 3/2002 | Powers et al. |
| 6,362,818 B1 | 3/2002 | Gardiner et al. |
| 6,363,089 B1 | 3/2002 | Fernald et al. |
| 6,366,721 B1 | 4/2002 | Hu et al. |
| 6,369,936 B1 | 4/2002 | Moulin |
| 6,370,312 B1 | 4/2002 | Wagoner et al. |
| 6,374,011 B1 | 4/2002 | Wagoner et al. |
| 6,374,015 B1 | 4/2002 | Lin |
| 6,375,366 B1 | 4/2002 | Kato et al. |
| 6,381,072 B1 | 4/2002 | Burger |
| 6,381,385 B1 | 4/2002 | Watley et al. |
| 6,384,828 B1 | 5/2002 | Arbeiter et al. |
| 6,388,241 B1 | 5/2002 | Ang |
| 6,393,036 B1 | 5/2002 | Kato |
| 6,393,181 B1 | 5/2002 | Bulman et al. |
| 6,396,994 B1 | 5/2002 | Philipson et al. |
| 6,404,425 B1 | 6/2002 | Cosman |
| 6,407,736 B1 | 6/2002 | Regan |
| 6,411,425 B1 | 6/2002 | Kowarz et al. |
| 6,421,636 B1 | 7/2002 | Cooper et al. |
| 6,424,343 B1 | 7/2002 | Deering et al. |
| 6,429,876 B1 | 8/2002 | Morein |
| 6,429,877 B1 | 8/2002 | Stroyan |
| 6,433,823 B1 | 8/2002 | Nakamura et al. |
| 6,433,838 B1 | 8/2002 | Chen |
| 6,433,840 B1 | 8/2002 | Poppleton |
| 6,437,789 B1 | 8/2002 | Tidwell et al. |
| 6,445,362 B1 | 9/2002 | Tegreene |
| 6,445,433 B1 | 9/2002 | Levola |
| 6,449,071 B1 | 9/2002 | Farhan et al. |
| 6,449,293 B1 | 9/2002 | Pedersen et al. |
| 6,452,667 B1 | 9/2002 | Fernald et al. |
| 6,456,288 B1 | 9/2002 | Brockway et al. |
| 6,466,206 B1 | 10/2002 | Deering |
| 6,466,224 B1 | 10/2002 | Nagata et al. |
| 6,470,036 B1 | 10/2002 | Bailey et al. |
| 6,473,090 B1 | 10/2002 | Mayer |
| 6,476,848 B2 | 11/2002 | Kowarz et al. |
| 6,480,513 B1 | 11/2002 | Kapany et al. |
| 6,480,634 B1 | 11/2002 | Corrigan |
| 6,490,931 B1 | 12/2002 | Fernald et al. |
| 6,496,160 B1 | 12/2002 | Tanner et al. |
| 6,507,706 B1 | 1/2003 | Brazas et al. |
| 6,510,272 B1 | 1/2003 | Wiegand |
| 6,511,182 B1 | 1/2003 | Agostinelli et al. |
| RE37,993 E | 2/2003 | Zhang |
| 6,519,388 B1 | 2/2003 | Fernald et al. |
| 6,522,809 B1 | 2/2003 | Takabayashi et al. |
| 6,525,740 B1 | 2/2003 | Cosman |
| 6,529,310 B1 | 3/2003 | Huibers et al. |
| 6,529,531 B1 | 3/2003 | Everage et al. |
| 6,534,248 B2 | 3/2003 | Jain et al. |
| 6,538,656 B1 | 3/2003 | Cheung et al. |
| 6,549,196 B1 | 4/2003 | Taguchi et al. |
| 6,554,431 B1 | 4/2003 | Binsted et al. |
| 6,556,627 B2 | 4/2003 | Kitamura et al. |
| 6,563,968 B2 | 5/2003 | Davis et al. |
| 6,574,352 B1 | 6/2003 | Skolmoski |
| 6,575,581 B2 | 6/2003 | Tsurushima |
| 6,577,429 B1 | 6/2003 | Kurtz et al. |
| 6,580,430 B1 | 6/2003 | Hollis et al. |
| 6,591,020 B1 | 7/2003 | Klassen |
| 6,594,043 B1 | 7/2003 | Bloom et al. |
| 6,597,363 B1 | 7/2003 | Duluk, Jr. et al. |
| 6,598,979 B2 | 7/2003 | Yoneno |
| 6,600,460 B1 | 7/2003 | Mays, Jr. |
| 6,600,830 B1 | 7/2003 | Lin et al. |
| 6,600,854 B2 | 7/2003 | Anderegg et al. |
| 6,603,482 B1 | 8/2003 | Tidwell |
| 6,643,299 B1 | 11/2003 | Lin |
| 6,646,645 B2 | 11/2003 | Simmonds et al. |
| 6,650,326 B1 | 11/2003 | Huber et al. |
| 6,671,293 B2 | 12/2003 | Kopp et al. |
| 6,678,085 B2 | 1/2004 | Kowarz et al. |
| 6,690,655 B1 | 2/2004 | Miner et al. |
| 6,692,129 B2 | 2/2004 | Gross et al. |
| 6,711,187 B2 | 3/2004 | Tanner et al. |
| 6,727,918 B1 | 4/2004 | Nason |
| 6,738,105 B1 | 5/2004 | Hannah et al. |
| 6,741,384 B1 | 5/2004 | Martin et al. |
| 6,747,649 B1 | 6/2004 | Sanz-Pastor et al. |
| 6,747,781 B2 | 6/2004 | Trisnadi |
| 6,751,001 B1 | 6/2004 | Tanner et al. |
| 6,760,036 B2 | 7/2004 | Tidwell |
| 6,763,042 B2 | 7/2004 | Williams et al. |
| 6,773,142 B2 | 8/2004 | Rekow |
| 6,776,045 B2 | 8/2004 | Fernald et al. |
| 6,782,205 B2 | 8/2004 | Trisnadi et al. |
| 6,788,304 B1 | 9/2004 | Hart et al. |
| 6,788,307 B2 | 9/2004 | Coleman et al. |
| 6,789,903 B2 | 9/2004 | Parker et al. |
| 6,791,562 B2 | 9/2004 | Cosman et al. |
| 6,793,350 B1 | 9/2004 | Raskar et al. |
| 6,798,418 B1 | 9/2004 | Sartori et al. |
| 6,799,850 B2 | 10/2004 | Hong et al. |
| 6,801,205 B2 | 10/2004 | Gardiner et al. |
| 6,809,731 B2 | 10/2004 | Muffler et al. |
| 6,811,267 B1 | 11/2004 | Allen et al. |
| 6,816,169 B2 | 11/2004 | Cosman |
| 6,831,648 B2 | 12/2004 | Mukherjee et al. |
| 6,840,627 B2 | 1/2005 | Olbrich |
| 6,842,298 B1 | 1/2005 | Shafer et al. |
| 6,856,449 B2 | 2/2005 | Winkler et al. |
| 6,868,212 B2 | 3/2005 | DeWitte et al. |
| 6,871,958 B2 | 3/2005 | Streid et al. |
| 6,897,878 B2 | 5/2005 | Cosman et al. |
| 6,943,803 B1 | 9/2005 | Cosman et al. |
| 6,956,582 B2 | 10/2005 | Tidwell |
| 6,956,878 B1 | 10/2005 | Trisnadi |
| 6,971,576 B2 | 12/2005 | Tsikos et al. |
| 6,984,039 B2 | 1/2006 | Agostinelli |
| 6,985,663 B2 | 1/2006 | Catchmark et al. |
| 7,012,669 B2 | 3/2006 | Streid et al. |
| 7,030,883 B2 | 4/2006 | Thompson |
| 7,038,735 B2 | 5/2006 | Coleman et al. |
| 7,043,102 B2 | 5/2006 | Okamoto et al. |
| 7,053,911 B2 | 5/2006 | Cosman |
| 7,053,912 B2 | 5/2006 | Cosman |
| 7,053,913 B2 | 5/2006 | Cosman |
| 7,054,051 B1 | 5/2006 | Bloom |
| 7,091,980 B2 | 8/2006 | Tidwell |
| 7,095,423 B2 | 8/2006 | Cosman et al. |
| 7,110,153 B2 | 9/2006 | Sakai |
| 7,110,624 B2 | 9/2006 | Williams et al. |
| 7,111,943 B2 | 9/2006 | Agostinelli et al. |

(56) References Cited

U.S. PATENT DOCUMENTS

| | | |
|---|---|---|
| 7,113,320 B2 | 9/2006 | Tanner |
| 7,133,583 B2 | 11/2006 | Marceau et al. |
| 7,169,630 B2 | 1/2007 | Moriwaka |
| 7,193,765 B2 | 3/2007 | Christensen et al. |
| 7,193,766 B2 | 3/2007 | Bloom |
| 7,197,200 B2 | 3/2007 | Marceau et al. |
| 7,210,786 B2 | 5/2007 | Tamura et al. |
| 7,215,840 B2 | 5/2007 | Marceau et al. |
| 7,237,916 B2 | 7/2007 | Mitomori |
| 7,257,519 B2 | 8/2007 | Cosman |
| 7,267,442 B2 | 9/2007 | Childers et al. |
| 7,277,216 B2 | 10/2007 | Bloom |
| 7,286,277 B2 | 10/2007 | Bloom et al. |
| 7,317,464 B2 | 1/2008 | Willis |
| 7,327,909 B2 | 2/2008 | Marceau et al. |
| 7,334,902 B2 | 2/2008 | Streid et al. |
| 7,354,157 B2 * | 4/2008 | Takeda et al. ............ 353/30 |
| 7,364,309 B2 | 4/2008 | Sugawara et al. |
| 7,400,449 B2 | 7/2008 | Christensen et al. |
| 7,420,177 B2 | 9/2008 | Williams et al. |
| 7,594,965 B2 | 9/2009 | Tanaka |
| 2001/0002124 A1 | 5/2001 | Mamiya et al. |
| 2001/0010536 A1* | 8/2001 | Katzir et al. ............ 347/255 |
| 2001/0027456 A1 | 10/2001 | Lancaster et al. |
| 2001/0047251 A1 | 11/2001 | Kemp |
| 2002/0005862 A1 | 1/2002 | Deering |
| 2002/0021462 A1 | 2/2002 | Delfyett et al. |
| 2002/0030769 A1 | 3/2002 | Bae |
| 2002/0042674 A1 | 4/2002 | Mochizuki et al. |
| 2002/0067467 A1 | 6/2002 | Dorval et al. |
| 2002/0071453 A1 | 6/2002 | Lin |
| 2002/0075202 A1 | 6/2002 | Fergason |
| 2002/0101647 A1 | 8/2002 | Moulin |
| 2002/0136121 A1 | 9/2002 | Salmonsen et al. |
| 2002/0145615 A1 | 10/2002 | Moore |
| 2002/0145806 A1 | 10/2002 | Amm |
| 2002/0146248 A1 | 10/2002 | Herman et al. |
| 2002/0154860 A1 | 10/2002 | Fernald et al. |
| 2002/0176134 A1 | 11/2002 | Vohra |
| 2002/0196414 A1 | 12/2002 | Manni et al. |
| 2003/0035190 A1 | 2/2003 | Brown et al. |
| 2003/0038807 A1 | 2/2003 | Demos et al. |
| 2003/0039443 A1 | 2/2003 | Catchmark et al. |
| 2003/0048275 A1 | 3/2003 | Ciolac |
| 2003/0081303 A1 | 5/2003 | Sandstrom et al. |
| 2003/0086647 A1 | 5/2003 | Willner et al. |
| 2003/0142319 A1 | 7/2003 | Ronnekleiv et al. |
| 2003/0160780 A1 | 8/2003 | Lefebvre et al. |
| 2003/0174312 A1 | 9/2003 | Leblanc |
| 2003/0214633 A1 | 11/2003 | Roddy et al. |
| 2003/0235304 A1 | 12/2003 | Evans et al. |
| 2004/0017518 A1 | 1/2004 | Stern et al. |
| 2004/0017608 A1 | 1/2004 | Lantz |
| 2004/0085283 A1 | 5/2004 | Wang |
| 2004/0136074 A1 | 7/2004 | Ford et al. |
| 2004/0165154 A1 | 8/2004 | Kobori et al. |
| 2004/0179007 A1 | 9/2004 | Bower et al. |
| 2004/0183954 A1 | 9/2004 | Hannah et al. |
| 2004/0184013 A1 | 9/2004 | Raskar et al. |
| 2004/0196660 A1 | 10/2004 | Usami |
| 2004/0207618 A1 | 10/2004 | Williams et al. |
| 2005/0018309 A1 | 1/2005 | McGuire, Jr. et al. |
| 2005/0024722 A1 | 2/2005 | Agostinelli et al. |
| 2005/0047134 A1 | 3/2005 | Mueller et al. |
| 2005/0093854 A1 | 5/2005 | Kennedy et al. |
| 2005/0243389 A1 | 11/2005 | Kihara |
| 2006/0039051 A1 | 2/2006 | Baba et al. |
| 2006/0114544 A1 | 6/2006 | Bloom et al. |
| 2006/0176912 A1 | 8/2006 | Anikitchev |
| 2006/0221429 A1 | 10/2006 | Christensen et al. |
| 2006/0238851 A1 | 10/2006 | Bloom |
| 2006/0255243 A1 | 11/2006 | Kobayashi et al. |
| 2007/0183473 A1 | 8/2007 | Bicknell et al. |
| 2008/0037125 A1 | 2/2008 | Takamiya |
| 2008/0218837 A1 | 9/2008 | Yang et al. |
| 2009/0033875 A1* | 2/2009 | King et al. ............ 353/31 |

FOREIGN PATENT DOCUMENTS

| | | |
|---|---|---|
| EP | 0 155 858 | 9/1985 |
| EP | 0 306 308 | 3/1989 |
| EP | 0 319 165 | 7/1989 |
| EP | 0 417 039 | 3/1991 |
| EP | 0 480 570 | 4/1992 |
| EP | 0 488 326 | 6/1992 |
| EP | 0 489 594 | 6/1992 |
| EP | 0 528 646 | 2/1993 |
| EP | 0 530 760 | 3/1993 |
| EP | 0 550 189 | 7/1993 |
| EP | 0 610 665 | 8/1994 |
| EP | 0 621 548 | 10/1994 |
| EP | 0 627 644 | 12/1994 |
| EP | 0 627 850 | 12/1994 |
| EP | 0 643 314 | 3/1995 |
| EP | 0 654 777 | 5/1995 |
| EP | 0 658 868 | 6/1995 |
| EP | 0 689 078 | 12/1995 |
| EP | 0 801 319 | 10/1997 |
| EP | 0 880 282 | 11/1998 |
| EP | 1 365 584 | 11/2003 |
| GB | 2 118 365 | 10/1983 |
| GB | 2 144 608 | 3/1985 |
| GB | 2 179 147 | 2/1987 |
| GB | 2 245 806 | 1/1992 |
| GB | 2 251 770 | 7/1992 |
| GB | 2 251 773 | 7/1992 |
| GB | 2 266 385 | 10/1993 |
| GB | 2 293 079 | 3/1996 |
| JP | 63-305323 | 12/1988 |
| JP | 2-219092 | 8/1990 |
| JP | 2000-305481 | 11/2000 |
| WO | 87/01571 | 3/1987 |
| WO | 92/12506 | 7/1992 |
| WO | 93/02269 | 2/1993 |
| WO | 93/09472 | 5/1993 |
| WO | 93/18428 | 9/1993 |
| WO | 95/11473 | 4/1995 |
| WO | 95/27267 | 10/1995 |
| WO | 96/41217 | 12/1996 |
| WO | 96/41224 | 12/1996 |
| WO | 97/26569 | 7/1997 |
| WO | 98/15127 | 4/1998 |
| WO | 01/46248 | 6/2001 |
| WO | 01/57581 | 8/2001 |
| WO | 02/12925 | 2/2002 |
| WO | 02/23824 | 3/2002 |
| WO | 02/31575 | 4/2002 |
| WO | 03/001281 | 1/2003 |

OTHER PUBLICATIONS

Ellis, "Lo-cost Bimorph Mirrors in Adaptive Optics," Ph.D. Thesis, Imperial College of Science, Technology and Medicine—University of London, 1999.

Halevi, "Bimorph piezoelectric flexible mirror: graphical solution and comparison with experiment," J. Opt. Soc. Am., Jan. 1983, pp. 110-113, vol. 73, No. 1.

Kudryashov et al., "Adaptive Optics for High Power Laser ZBeam Control," Springer Proceedings in Physics, 2005, pp. 237-248, vol. 102.

Safronov, "Bimorph adaptive optics: elements, technology and design principles," SPIE, 1996, pp. 494-504, vol. 2774.

Solgaard, "Integrated Semiconductor Light Modulators for Fiber-Optic and Display Applications," Ph.D. Dissertation submitted to the Department of Electrical Engineering and the Committee on Graduate Studies of Stanford University, Feb. 1992.

Steinhaus et al., "Bimorph piezoelectric flexible mirror," J. Opt. Soc. Am., Mar. 1979, pp. 478-481, vol. 69, No. 3.

Tseng et al., "Development of an Aspherical Bimorph PZT Mirror Bender with Thin Film Resistor Electrode," Advanced Photo Source, Argonne National Laboratory, Sep. 2002, pp. 271-278.

(56) References Cited

OTHER PUBLICATIONS

Vinevich et al., "Cooled and uncooled single-channel deformable mirrors for industrial laser systems," Quantum Electronics, 1998, pp. 366-369, vol. 28, No. 4.
Abrash, "The Quake Graphics Engine," CGDC Quake Talk taken from Computer Game Developers Conference on Apr. 2, 1996. http://gamers.org/dEngine/quake/papers/mikeab-cgdc.html.
Akeley, "RealityEngine Graphics," Computer Graphics Proceedings, Annual Conference Series, 1993.
Allen, J. et al., "An Interactive Learning Environment for VLSI Design," Proceedings of the IEEE, Jan. 2000, pp. 96-106, vol. 88, No. 1.
Allen, W. et al., "47.4: Invited Paper: Wobulation: Doubling the Addressed Resolution of Projection Displays," SID 05 Digest, 2005, pp. 1514-1517.
Amm, et al., "5.2: Grating Light Valve™ Technology: Update and Novel Applications," Presented at Society for Information Display Symposium, May 19, 1998, Anaheim, California.
Apgar et al., "A Display System for the Stellar™ Graphics Supercomputer Model GS1000™," Computer Graphics, Aug. 1988, pp. 255-262, vol. 22, No. 4.
Baer, Computer Systems Architecture, 1980, Computer Science Press, Inc., Rockville, Maryland.
Barad et al., "Real-Time Procedural Texturing Techniques Using MMX," Gamasutra, May 1, 1998, http://www.gamasutra.com/features/19980501/mmxtexturing_01.htm.
Bass, "4K GLV Calibration," E&S Company, Jan. 8, 2008.
Becker et al., "Smooth Transitions between Bump Rendering Algorithms," Computer Graphics Proceedings, 1993, pp. 183-189.
Bishop et al., "Frameless Rendering: Double Buffering Considered Harmful," Computer Graphics Proceedings, Annual Conference Series, 1994.
Blinn, "Simulation of Wrinkled Surfaces," Siggraph '78 Proceedings, 1978, pp. 286-292.
Blinn, "A Trip Down the Graphics Pipeline: Subpixelic Particles," IEEE Computer Graphics & Applications, Sep./Oct. 1991, pp. 86-90, vol. 11, No. 5.
Blinn et al., "Texture and Reflection in Computer Generated Images," Communications of the ACM, Oct. 1976, pp. 542-547, vol. 19, No. 10.
Boyd et al., "Parametric Interaction of Focused Gaussian Light Beams," Journal of Applied Physics, Jul. 1968, pp. 3597-3639vol. 39, No. 8.
Brazas et al., "High-Resolution Laser-Projection Display System Using a Grating Electromechanical System (GEMS)," MOEMS Display and Imaging Systems II, Proceedings of SPIE, 2004, pp. 65-75vol. 5348.
Bresenham, "Algorithm for computer control of a digital plotter," IBM Systems Journal, 1965, pp. 25-30, vol. 4, No. 1.
Carlson, "An Algorithm and Data Structure for 3D Object Synthesis Using Surface Patch Intersections," Computer Graphics, Jul. 1982, pp. 255-263, vol. 16, No. 3.
Carpenter, "The A-buffer, an Antialiased Hidden Surface Method," Computer Graphics, Jul. 1984, pp. 103-108, vol. 18, No. 3.
Carter, "Re: Re seams and creaseAngle (long)," posted on the GeoVRML.org website Feb. 2, 2000, http://www.ai.sri.com/geovrml/archive/msg00560.html.
Catmull, "An Analytic Visible Surface Algorithm for Independent Pixel Processing," Computer Graphics, Jul. 1984, pp. 109-115, vol. 18, No. 3.
Chasen, Geometric Principles and Procedures for Computer Graphic Applications, 1978, pp. 11-123, Upper Saddle River, New Jersey.
Choy et al., "Single Pass Algorithm for the Generation of Chain-Coded Contours and Contours Inclusion Relationship," Communications, Computers and Signal Processing—IEEE Pac Rim '93, 1993, pp. 256-259.
Clark et al., "Photographic Texture and CIG: Modeling Strategies for Production Data Bases," 9th VITSC Proceedings, Nov. 30-Dec. 2, 1987, pp. 274-283.
Corrigan et al., "Grating Light Valve™ Technology for Projection Displays," Presented at the International Display Workshop—Kobe, Japan, Dec. 9, 1998.
Crow, "Shadow Algorithms for Computer Graphics," Siggraph '77, Jul. 20-22, 1977, San Jose, California, pp. 242, 248.
Deering et al., "FBRAM: A new Form of Memory Optimized for 3D Graphics," Computer Graphics Proceedings, Annual Conference Series, 1994.
Drever et al., "Laser Phase and Frequency Stabilization Using an Optical Resonator," Applied Physics B: Photophysics and Laser Chemistry, 1983, pp. 97-105, vol. 31.
Duchaineau et al., "ROAMing Terrain: Real-time Optimally Adapting Meshes," Los Alamos National Laboratory and Lawrence Livermore National Laboratory, 1997.
Duff, "Compositing 3-D Rendered Images," Siggraph '85, Jul. 22-26, 1985, San Francisco, California, pp. 41-44.
Faux et al., Computational Geometry for Design and Manufacture, 1979, Ellis Horwood, Chicester, United Kingdom.
Feiner et al., "Dial: A Diagrammatic Animation Language," IEEE Computer Graphics & Applications, Sep. 1982, pp. 43-54, vol. 2, No. 7.
Fiume et al., "A Parallel Scan Conversion Algorithm with Anti-Aliasing for a General-Purpose Ultracomputer," Computer Graphics, Jul. 1983, pp. 141-150, vol. 17, No. 3.
Foley et al., Computer Graphics: Principles and Practice, 2nd ed., 1990, Addison-Wesley Publishing Co., Inc., Menlo Park, California.
Foley et al., Fundamentals of Interactive Computer Graphics, 1982, Addison-Wesley Publishing Co., Inc., Menlo Park, California.
Fox et al., "Development of Computer-Generated Imagery for a Low-Cost Real-Time Terrain Imaging System," IEEE 1986 National Aerospace and Electronic Conference, May 19-23, 1986, pp. 986-991.
Gambotto, "Combining Image Analysis and Thermal Models for Infrared Scene Simulations," Image Processing Proceedings, ICIP-94, IEEE International Conference, 1994, vol. 1, pp. 710-714.
Gardiner, "A Method for Rendering Shadows," E&S Company, Sep. 25, 1996.
Gardiner, "Shadows in Harmony," E&S Company, Sep. 20, 1996.
Gardner, "Simulation of Natural Scenes Using Textured Quadric Surfaces," Computer Graphics, Jul. 1984, pp. 11-20, vol. 18, No. 3.
Gardner, "Visual Simulation of Clouds," Siggraph '85, Jul. 22-26, 1985, San Francisco, California, pp. 297-303.
Giloi, Interactive Computer Graphics: Data Structures, Algorithms, Languages, 1978, Prentice-Hall, Inc., Englewood Cliffs, New Jersey.
Glaskowsky, "Intel Displays 740 Graphics Chip: Auburn Sets New Standard for Quality—But Not Speed," Microprocessor Report, Feb. 16, 1998, pp. 5-9, vol. 12, No. 2.
Goshtasby, "Registration of Images with Geometric Distortions," IEEE Transactions on Geoscience and Remote Sensing, Jan. 1988, pp. 60-64, vol. 26, No. 1.
Great Britain Health & Safety Executive, The Radiation Safety of Lasers Used for Display Purposes, Oct. 1996.
Gupta et al., "Filtering Edges for Gray-Scale Displays," Computer Graphics, Aug. 1981, pp. 1-5, vol. 15, No. 3.
Gupta et al., "A VLSI Architecture for Updating Raster-Scan Displays," Computer Graphics, Aug. 1981, pp. 71-78, vol. 15, No. 3.
Hearn et al., Computer Graphics, 2nd ed., 1994, pp. 143-183.
Heckbert, "Survey of Texture Mapping," IEEE Computer Graphics and Applications, Nov. 1986, pp. 56-67.
Heckbert, "Texture Mapping Polygons in Perspective," New York Institute of Technology, Computer Graphics Lab, Technical Memo No. 13, Apr. 28, 1983.
Heidrich et al., "Applications of Pixel Textures in Visualization and Realistic Image Synthesis," Symposium on INteractive 3D Graphics, 1990, pp. 127-135, Atlanta, Georgia.
Holten-Lund, Design for Scalability in 3D Computer Graphics Architectures, Ph.D. thesis, Computer Science sand Technology Informatics and Mathematical Modelling, Technical University of Denmark, Jul. 2001.
INTEL740 Graphics Accelerator Datasheet, Apr. 1998.
INTEL470 Graphics Accelerator Datasheet, Architectural Overview, at least as early as Apr. 30, 1998.
Jacob, "Eye Tracking in Advanced Interface Design," ACM, 1995.

(56) References Cited

OTHER PUBLICATIONS

Kelley et al., "Hardware Accelerated Rendering of CSG and Transparency," SIGGRAPH '94, in Computer Graphics Proceedings, Annual Conference Series, 1994, pp. 177-184.
Klassen, "Modeling the Effect of the Atmosphere on Light," ACM Transactions on Graphics, Jul. 1987, pp. 215-237, vol. 6, No. 3.
Kleiss, "Tradeoffs Among Types of Scene Detail for Simulating Low-Altitude Flight," University of Dayton Research Institute, Aug. 1, 1992, pp. 1141-1146.
Lewis, "Algorithms for Solid Noise Synthesis," SIGGRAPH '89, Computer Graphics, Jul. 1989, pp. 263-270, vol. 23, No. 3.
Lindstrom et al., "Real-Time, Continuous Level of Detail Rendering of Height Fields," SIGGRAPH '96, Aug. 1996.
McCarty et al., "A Virtual Cockpit for a Distributed Interactive Simulation," IEEE Computer Graphics & Applications, Jan. 1994, pp. 49-54.
Microsoft Flight Simulator 2004, Aug. 9, 2000. http://www.microsoft.com/games/flightsimulator/fs2000_devdesk.sdk.asp.
Miller et al., "Illumination and Reflection Maps: Simulated Objects in Simulated and Real Environments," SIGGRAPH '84, Course Notes for Advances Computer Graphics Animation, Jul. 23, 1984.
Mitchell, "Spectrally Optimal Sampling for Distribution Ray Tracing," SIGGRAPH '91, Computer Graphics, Jul. 1991, pp. 157-165, vol. 25, No. 4.
Mitsubishi Electronic Device Group, "Overview of 3D-RAM and Its Functional Blocks," 1995.
Montrym et al., "InfiniteReality: A Real-Time Graphics System," Computer Graphics Proceedings, Annual Conference Series, 1997.
Mooradian et al., "High Power Extended Vertical Cavity Surface Emitting Diode Lasers and Arrays and Their Applications," Micro-Optics Conference, Tokyo, Nov. 2, 2005.
Musgrave et al., "The Synthesis and Rendering of Eroded Fractal Terrains," SIGGRAPH '89, Computer Graphics, Jul. 1989, pp. 41-50, vol. 23, No. 3.
Nakamae et al., "Compositing 3D Images with Antialiasing and Various Shading Effects," IEEE Computer Graphics & Applications, Mar. 1989, pp. 21-29, vol. 9, No. 2.
Newman et al., Principles of Interactive Computer Graphics, 2nd ed., 1979, McGraw-Hill Book Company, San Francisco, California.
Niven, "Trends in Laser Light Sources for Projection Display," Novalux International Display Workshop, Session LAD2-2, Dec. 2006.
Oshima et al., "An Animation Design Tool Utilizing Texture," International Workshop on Industrial Applications of Machine Intelligence and Vision, Tokyo, Apr. 10-12, 1989, pp. 337-342.
Parke, "Simulation and Expected Performance Analysis of Multiple Processor Z-Buffer Systems," Computer Graphics, 1980, pp. 48-56.
Peachey, "Solid Texturing of Complex Surfaces," SIGGRAPH '85, 1985, pp. 279-286, vol. 19, No. 3.
Peercy et al., "Efficient Bump Mapping Hardware," Computer Graphics Proceedings, 1997.
Perlin, "An Image Synthesizer," SIGGRAPH '85, 1985, pp. 287-296, vol. 19, No. 3.
Pineda, "A Parallel Algorithm for Polygon Rasterization," SIGGRAPH '88, Aug. 1988, pp. 17-20, vol. 22, No. 4.
Porter et al., "Compositing Digital Images," SIGGRAPH '84, Computer Graphics, Jul. 1984, pp. 253-259, vol. 18, No. 3.
Poulton et al., "Breaking the Frame-Buffer Bottleneck with Logic-Enhanced Memories," IEEE Computer Graphics & Applications, Nov. 1992, pp. 65-74.
Reeves et al., "Rendering Antialiased Shadows with Depth Maps," SIGGRAPH '87, Computer Graphics, Jul. 1987, pp. 283-291, vol. 21, No. 4.
Regan et al., "Priority Rendering with a Virtual Reality Address Recalculation Pipeline," Computer Graphics Proceedings, Annual Conference Series, 1994.
Rhoades et al., "Real-Time Procedural Textures," ACM, Jun. 1992, pp. 95-100, 225.
Rockwood et al., "Blending Surfaces in Solid Modeling," Geometric Modeling: Algorithms and New Trends, 1987, pp. 367-383, Society for Industrial and Applied Mathematics, Philadelphia, Pennsylvania.
Röttger et al., "Real-Time Generation of Continuous Levels of Detail for Height Fields," WSCG '98, 1998.
Saha et al., "Web-based Distributed VLSI Design," IEEE, 1997, pp. 449-454.
Salzman et al., "VR's Frames of Reference: A Visualization Technique for Mastering Abstract Multidimensional Information," CHI 99 Papers, May 1999, pp. 489-495.
Sandejas, Silicon Microfabrication of Grating Light Valves, Doctor of Philosophy Dissertation, Stanford University, Jul. 1995.
Scarlatos, "A Refined Triangulation Hierarchy for Multiple Levels of Terrain Detail," presented at the Image V Conference, Phoenix, Arizona, Jun. 19-22, 1990, pp. 114-122.
Schilling, "A New Simple and Efficient Antialiasing with Subpixel Masks," SIGGRAPH '91, Computer Graphics, Jul. 1991, pp. 133-141, vol. 25, No. 4.
Schumacker, "A New Visual System Architecture," Proceedings of the Second Interservices/Industry Training Equipment Conference, Nov. 18-20, 1990, Salt Lake City, Utah.
Segal et al., "Fast Shadows and Lighting Effects Using Texture Mapping," SIGGRAPH '92, Computer Graphics, Jul. 1992, pp. 249-252, vol. 26, No. 2.
Sick AG, S3000 Safety Laser Scanner Operating Instructions, Aug. 25, 2005.
Silicon Light Machines, "White Paper: Calculating Response Characteristics for the 'Janis' GLV Module, Revision 2.0," Oct. 1999.
Stevens et al., "The National Simulation Laboratory: The Unifying Tool for Air Traffic Control System Development," Proceedings of the 1991 Winter Simulation Conference, 1991, pp. 741-746.
Stone, High-Performance Computer Architecture, 1987, pp. 278-330, Addison-Wesley Publishing Company, Menlo Park, California.
Tanner et al., "The Clipmap: A Virtual Mipmap," Silicon Graphics Computer Systems; Proceedings of the 25th Annual Conference on Computer Graphics and Interactive Techniques, Jul. 1998.
Tanriverdi et al., "Interacting with Eye Movements in Virtual Environments," CHI Letters, Apr. 2000, pp. 265-272, vol. 2, No. 1.
Texas Instruments, DLP® 3-D HDTV Technology, 2007.
Torborg et al., "Talisman: Commodity Realtime 3D Graphics for the PC," Computer Graphics Proceedings, Annual Conference Series, 1996, pp. 353-363.
Trisnadi, "Hadamard speckle contrast reduction," Optics Letters, 2004, vol. 29, pp. 11-13.
Trisnadi et al., "Overview and applications of Grating Light Valve™ based optical write engines for high-speed digital imaging", proceedings of conference "MOEMS Display and Imaging SYstems II," Jan. 2004, vol. 5328, 13 pages.
Whitton, "Memory Design for Raster Graphics Displays," IEEE Computer Graphics & Applications, Mar. 1984, pp. 48-65.
Williams, "Casting Curved Shadows on Curved Surfaces," Computer Graphics Lab, New York Institute of Technology, 1978, pp. 270-274.
Williams, "Pyramidal Parametrics," Computer Graphics, Jul. 1983, pp. 1-11, vol. 17, No. 3.
Willis et al., "A Method for Continuous Adaptive Terrain," Presented at the 1996 Image Conference, Jun. 23-28, 1996.
Woo et al., "A Survey of Shadow Algorithms," IEEE Computer Graphics & Applications, Nov. 1990, pp. 13-32, vol. 10, No. 6.
Wu et al., "A Differential Method for Simultaneous Estimation of Rotation, Change of Scale and Translation," Signal Processing: Image Communication, 1990, pp. 69-80, vol. 2, No. 1.
Youbing et al., "A Fast Algorithm for Large Scale Terrain Walkthrough," CAD/Graphics, Aug. 22-24, 2001, 6 pages.
Sollberger et al., "Frequency Stabilization of Semiconductor Lasers for Applications in Coherent Communication Systems," Journal of Lightwave Technology, Apr. 1987, pp. 485-491, vol. LT-5, No. 4.

* cited by examiner

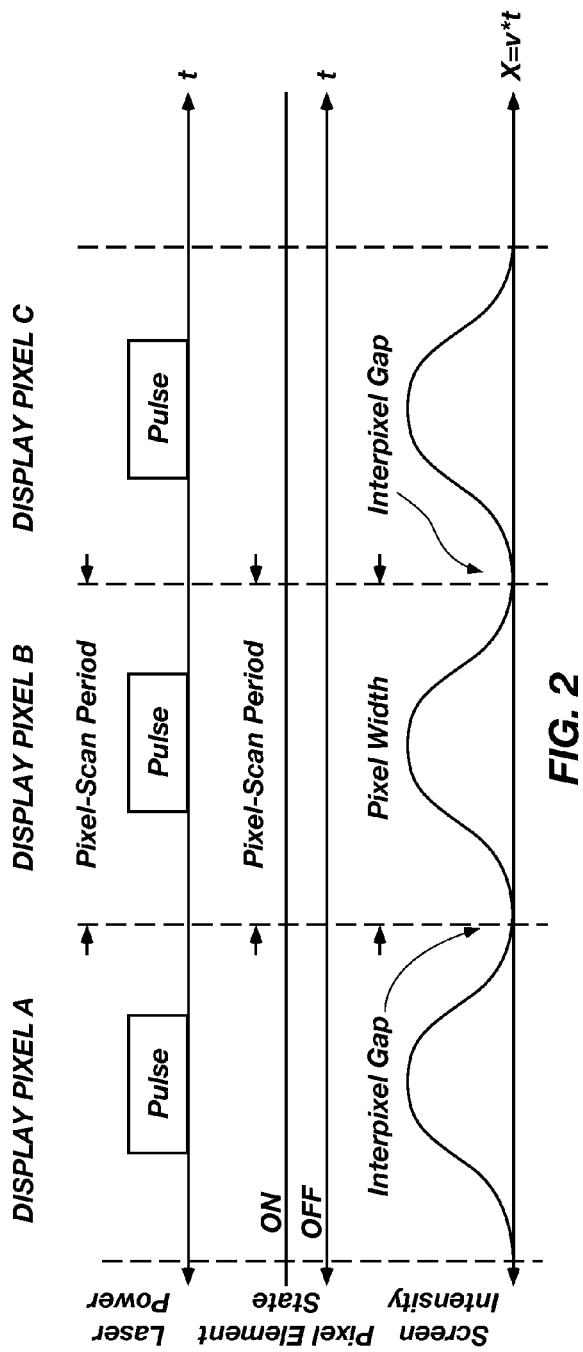
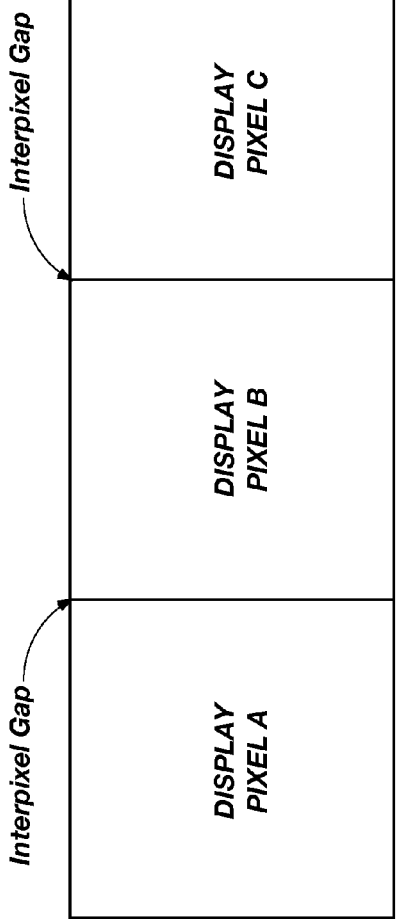
FIG. 2
FIG. 3

PROJECTION METHOD FOR REDUCING INTERPIXEL GAPS ON A VIEWING SURFACE

CROSS-REFERENCE TO RELATED APPLICATIONS

This application claims the benefit of U.S. Provisional Application No. 61/060,744, filed Jun. 11, 2008, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to display systems, and more particularly, but not necessarily entirely, to display systems that utilize pulsed laser illumination sources.

2. Description of Background Art

Advanced display devices are becoming more prevalent in modern society. Such display devices are used to display information in a wide variety of settings providing, inter alia, education and entertainment. There have been several recent promised enhancements to display technologies including: increased resolution, increased contrast and increased brightness levels as well as other characteristics that improve the overall quality of images produced with dynamic video display systems.

Technologies used to produce advanced video displays include: Texas Instruments' DLP® projector using a digital micromirror device ("DMD"), Sony's SXRD® system and JVC's D-ILA® apparatus both which incorporate liquid crystal on silicon ("LCOS") technology, Kodak's grating electromechanical system ("GEMS") as well as systems using grating light valve ("GLV") technology. All of these particular technologies differ in the devices which are used to modulate the light which is projected, and such light modulation devices are at the core of each system and the component to which the rest of the system components surrounding them are designed.

Previously available display technologies have typically employed either a two-dimensional scan architecture or a column-scan architecture, sometimes referred to as a one-dimensional scan architecture, to form an image on a viewing surface. In a display device employing a two-dimensional scan architecture, the underlying light modulation device includes a two-dimensional array of pixel elements able to generate an entire frame of an image at one time. The two-dimensional array of pixel elements may include micro-electro-mechanical ("MEMS") structures. Alternatively, the two-dimensional array of pixel elements may include liquid crystals, such as those incorporating LCOS technology. In a display device employing a column-scan architecture, the underlying light modulation device may include a one-dimensional array of MEMS pixel elements able to draw a single column of the image at a time. To generate an entire image on the viewing surface, the single columns of the image are scanned, one-by-one, across the viewing surface, by a scanning device, such as a rotating scanning mirror or oscillating scanning mirror. As used herein, a scanning device may refer to any device having a moving reflective surface operable to scan modulated beams of light onto a viewing surface.

In the past, the previously available display technologies incorporated a variety of different light sources. For example, some of the display technologies utilize an incandescent lamp for generating white light which is passed through a color wheel as the light travels to the surface of the light modulation device. The use of a incandescent lamp in a display system has drawbacks, including, the limited life of the lamp and the need for color filters or a mechanized color wheel to produce different colored light.

Other light sources for light modulation devices have, in the past, included continuous wave lasers. The benefits which accompany the use of the continuous wave lasers include the ability to eliminate the need for separating white light into primary colors and their high power output. However, continuous wave lasers are in some instances disadvantageous due to their high power consumption, complex technical design, and excessive heat output.

Recently, improvements in the operation of semiconductor pulsed lasers have made them more attractive for use as light sources in display devices that utilize light modulators. These improvements eliminate some of the problems associated with the use of lamps and continuous wave lasers. However, even with the benefits provided over the previously available light sources, the use of semiconductor lasers in a display device is still faced with significant challenges of its own.

For example, one drawback to the use of semiconductor lasers is that in order to achieve maximum light intensity, the semiconductor lasers suitable for use in a display device must operate at a relatively low duty cycle. Another drawback to the use of semiconductor lasers is that their power output is relatively low when compared with some of the continuous wave lasers that have been previously available.

Another previous drawback to the use of pulsed light sources, such as a semiconductor laser operating at less than 100% duty cycle, in display devices having a column-scan architecture has been that most such display devices have previously required a light source that produces continuous light, such as a continuous wave laser, in order to generate an acceptable image. That is, past attempts to use pulsed light sources in a display device having a column-scan architecture have been unsuccessful as the pulsed light sources caused noticeable irregularities in the displayed image.

In particular, as the columns of pixels are each scanned across a viewing surface from a display device using pulsed light sources, undesirable vertical stripes and interpixel gaps are visible in the image due to the pulsed nature of the light incident on the light modulator. A primary cause of these vertical stripes and interpixel gaps is believed to be the relatively short pulse time of the pulsed laser sources when compared to the time necessary to scan a column of pixels on a viewing surface. In some instances, the duty cycle of the pulsed lasers, the ratio of the duration of a laser pulse to the time necessary to scan a column or pixel, is less than 50%. This means that, in some cases, the pulsed lasers are only active for an interval which is less than one-half of the time it takes to scan one full column or pixel. The end result of the low duty cycle of the pulsed lasers is that an intensity drop occurs at the edges of the pixels in a column. This problem becomes even more apparent when two columns of pixels in adjacent columns are viewed side-by-side.

It would therefore be an improvement over the previously available technologies and devices to significantly reduce, or eliminate altogether, the irregularities caused by the use of pulsed light sources in a display device. It would be a further improvement over the previously available technologies and devices to significantly reduce, or eliminate altogether, the irregularities caused by the use of pulsed light sources in a display device having a column-scan architecture.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 2 is an overlay of three graphs showing the effects of using a single pulse of light with a low duty cycle to form a display pixel on a viewing surface;

FIG. 3 is a depiction of the interpixel gaps between three adjacent pixels on a viewing surface;

DETAILED DESCRIPTION

Figure 1:
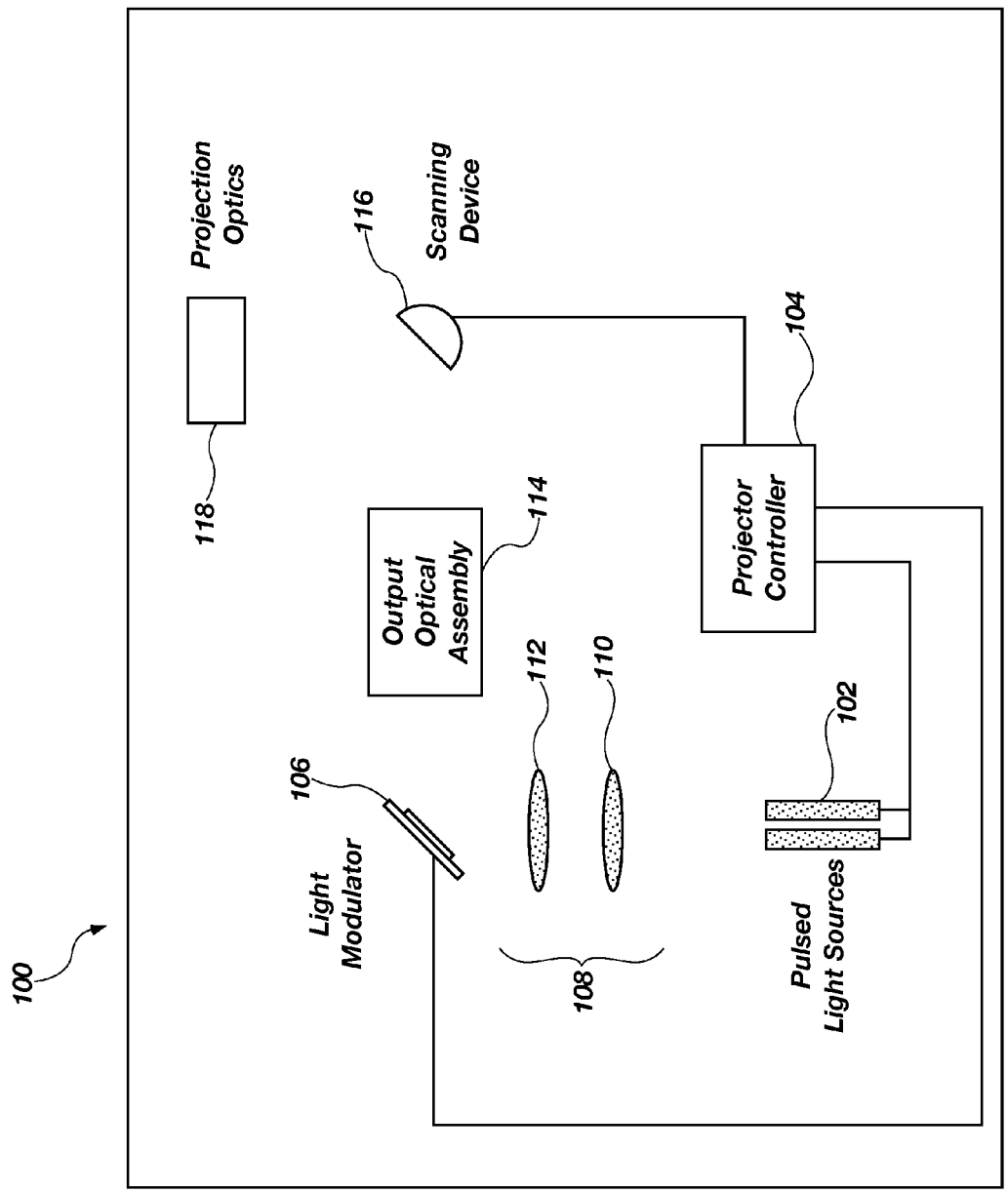
FIG. 1 is a diagram of a display system pursuant to an exemplary embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Referring now to FIG. 1, there is depicted an exemplary display system 100 for generating an image on a viewing surface in a single primary color, such as red, green, or blue. It will be appreciated that to generate the image in full-color on the viewing surface, that other systems of similar design for may be combined with, or incorporated into, the system 100. The display system 100 may comprise a plurality of pulsed light sources 102, such as semiconductor lasers. While only two pulsed light sources 102 are shown in FIG. 1, it will be appreciated that any number of pulsed light sources 102 may be utilized in system 100 to generate the desired on screen intensity. For example, in an embodiment of the present disclosure, eight pulsed light sources may be utilized.

The pulsed light sources 102 may each comprise semiconductor lasers that are able to emit pulsed beams of light of a predetermined wavelength. The light emissions of the pulsed light sources 102 may be controlled by a projector controller 104. That is, the projector controller 104 may control the duration and timing of the pulses of light emitted from the pulsed light sources 102. In addition to controlling the pulsed light sources 102, the projector controller 104 may control a light modulator 106 for modulating pulsed beams of light from the pulsed light sources 102. The projection controller 104 may also control a scanning device 116. The light modulator 106 may include a one-dimensional array of pixel elements.

As used herein, the term "pixel element" may refer to one or more MEMS structures that receives light from a light source and modulates the light to form a corresponding display pixel on a viewing surface. Typically, each pixel element is able to vary the intensity of a corresponding display pixel between a dark state and a bright state.

Further, in a display system using a column-scan architecture, each pixel element may be associated with an entire row of display pixels on the viewing surface. That is, each pixel element is functional to form more than one display pixel on the viewing surface. It will be noted that, as used herein, the term "display pixel" may refer to one of a plurality of small spots of light on a viewing surface that are perceived by a human to form an image. A typical image may be comprised of millions of display pixels arranged in columns and rows on a viewing surface.

One type of light modulator 106 suitable for use with the present disclosure includes a plurality of reflective and deformable ribbons suspended over a substrate. These ribbons are arranged in a column of parallel rows and may be deflected, i.e, pulled down, by applying a bias voltage between the ribbons and the substrate. A first group of the ribbons may comprise alternate rows of the ribbons. The ribbons of the first group may be collectively driven by a single digital-to-analog controller ("DAC") such that a common bias voltage may be applied to each of them at the same time. For this reason, the ribbons of the first group are sometimes referred to as "bias ribbons." A second group of ribbons may comprise those alternate rows of ribbons that are not part of the first group. Each of the ribbons of the second group may be individually addressable or controllable by its own dedicated DAC device such that a variable bias voltage may be independently applied to each of them. For this reason, the ribbons of the second group are sometimes referred to as "active ribbons."

The bias and active ribbons may be sub-divided into separately controllable picture elements referred to herein as "pixel elements." Each pixel element contains, at a minimum, a bias ribbon and an active ribbon. When the reflective surfaces of the bias and active ribbons of a pixel element are co-planar, incident light directed onto the pixel element is reflected. By blocking the reflected light from a pixel element, a dark spot is produced on the viewing surface at a corresponding display pixel. When the reflective surfaces of the bias and active ribbons of a pixel element are not co-planar, incident light may be both diffracted and reflected off of the pixel element. By separating the desired diffracted light from the undesired diffracted light and reflected light, the desired diffracted light produces a bright spot on the corresponding display pixel.

The intensity of the light produced on the viewing surface by a pixel element may be controlled by varying the separation or deflection between the reflective surfaces of its active and bias ribbons. Typically, this is accomplished by varying the voltage applied to the active ribbon while holding the bias ribbon at a common bias voltage. It has been previously determined that the maximum light intensity output for a pixel element may occur in a diffraction based system when the distance between the reflective surfaces its active and bias ribbons is $\lambda/4$, where $\lambda$ is the wavelength of the light incident on the pixel element. The minimum light intensity output for a pixel element may occur when the reflective surfaces of its active and bias ribbons are co-planar. Intermediate light intensities may be output from the pixel element by varying the separation between the reflective surfaces of the active and bias ribbons between co-planar and $\lambda/4$.

Referring back to FIG. 1, prior to striking the pixel elements on the light modulator 106, beams of pulsed light from the pulsed light sources 102 may first pass through an input optical assembly 108, which may have different cylindrical elements that are represented by a Y-collimating lens assembly 110 and an X-focus lens 112. The input optical assembly 108 conditions the light for modulation by the light modulator 106 and may include a light tunnel (not shown) as disclosed in U.S. patent application Ser. No. 12/288,577 filed on Oct. 20, 2008, which is hereby incorporated by reference in its entirety. In particular, the output of the input optical assembly 108 is a column of light corresponding in shape to the one-dimensional array of pixel elements on the light modulator 106 that may have a uniform or "top-hat" distribution in the Y-axis and a Gaussian distribution in the X-axis. In addition, the input optical assembly 108 may include an optical assembly for reducing etendue as disclosed in U.S. patent application Ser. No. 12/206,582 filed on Sep. 8, 2008, which is hereby incorporated by reference in its entirety.

The Y-collimating lens assembly 110 may collimate the light in a direction corresponding to a height of the one-dimensional array of pixel elements on the light modulator 106. The Y-collimating lens assembly 110 may include an ashperical Powell lens (not shown) and a collimating lens (not shown). The X-focus lens 112 may focus the light from the input optical assembly 108 in a direction corresponding to a width of the one-dimensional array of pixel elements on the light modulator 106. Thus, it will be appreciated that the Y-collimating lens assembly 110 and the X-focus lens 112 may be anamorphic.

The output optical assembly 114 may be operable to separate light from the light modulator 106 into a desired diffracted portion and an undesired diffracted portion and a reflected portion. The reflected portion and the undesired diffracted portion of the light from the light modulator 106 may be discarded, while the desired diffracted portion may be directed onto the scanning device 116, where it is scanned onto a viewing surface through projection optics 118. In particular, the scanning device 116 is operable to scan columns of display pixels onto a viewing surface column-by-column to thereby form a two-dimensional image. Each column of display pixels is individually modulated by the one-dimensional array of pixel elements on the light modulator 106.

The scanning device 116 may scan an entire image during a sweep of the viewing surface. It will be appreciated that in an embodiment of the present disclosure, the scanning device 116 may comprise an oscillating or rotating reflective surface, such as a mirror. In an embodiment of the present disclosure, the scanning device 116 may be any device able to scan a one-dimensional column of modulated light across a surface to thereby form a two-dimensional image. The time necessary to scan a two-dimensional image on a viewing surface will be referred to herein as a "frame scan period." The time necessary to scan a single column of display pixels will be referred to herein as a "column-scan period." The time necessary to scan a single pixel will be referred to herein as a "pixel-scan period." It will be appreciated that a column-scan period and a pixel-scan period may be the same in the display system 100 since a column is exactly one pixel wide in the scanning direction.

The pulsed light sources 102 may have an optimum pulse duration that is less than a pixel-scan period. (As used herein, the term "optimum pulse duration" may refer to a pulse duration of the pulsed light sources 102 that produces a maximum power output.) As previously explained, this means that the pulsed light sources 102 may be on (or active) for a duration that is less than the time it takes to scan a column or pixel if it is desired to operate at maximum power output for the light sources 102.

Referring now to FIG. 2, there is shown an overlay of three graphs for the system 100 where the pulsed light sources 102 are pulsed simultaneously at their optimum pulse duration for the formation of Display Pixels A, B and C. It will be appreciated that the Display Pixels A, B and C are located in the same row and in adjacent columns on the viewing surface. Because the Display Pixels A, B and C are in the same row of an image, they may be formed by the same pixel element on the light modulator 106 but at different times. The horizontal axes of the top and middle graphs in FIG. 2 represent time, t, while the horizontal axis on the bottom graph represents the width of a display pixel as determined from v*t, where v is the velocity of the scanning device 116 and t the pixel-scan period for the Display Pixels A, B and C.

The vertical axis for the top graph in FIG. 2 represents the output power of the pulsed light sources 102 (FIG. 1). The vertical axis for the middle graph represents the pixel element state for the pixel element on the light modulator 106 associated with the Display Pixels A, B and C. The vertical axis for the bottom graph represents the intensity of the Display Pixels A, B and C on a viewing surface. The dashed vertical lines between the Display Pixels A, B and C, represent the pixel-scan periods in the top and middle graphs, while they represent the relative widths of the Display Pixels A, B and C on the viewing surface in the bottom graph.

Referring now to the top graph in FIG. 2, each of the pulsed light sources 102 is pulsed simultaneously during each pixel-scan period for Display Pixels A, B and C and at the same duty cycle of about 50%. In an embodiment of the present disclosure, the duty cycle may be defined as the pulse duration divided by the pixel or column-scan period. Alternatively, the duty cycles of each of the pulsed light sources 102 may be less than about 50%, less than about 40%, or between about 30% and about 50%. It will be easily observed that the pulsed light sources 102 are not on or active for the entire duration of the pixel-scan periods for Display Pixels A, B and C. The middle graph in FIG. 2 shows that the pixel element state for the pixel element associated with Pixels A, B and C remains unchanged during each pixel-scan period. For example, the pixel element may be configured to produce the maximum display pixel intensity for Display Pixels A, B and C. It will be appreciated, however, that the state of the pixel element may vary for each pixel-scan period in the event that the intensities of the Display Pixels A, B and C are not the same.

The bottom graph in FIG. 2 shows a distribution of the light intensity of each of the Display Pixels A, B and C on the viewing surface. As can be observed, the intensity distributions of the Display Pixels A, B and C may be a Gaussian distribution on the viewing surface. Thus, it can be noted that the light intensities are at a maximum near the center of the Display Pixels A, B and C and at a minimum near the edges of the Display Pixels A, B and C. From the intensity distributions observed in the bottom graph in FIG. 2, it follows that there may be interpixel gaps in the light intensities between the Display Pixels A, B and C on the viewing surface.

As shown in FIG. 3, a representation of the Display Pixels A, B and C on a viewing surface as they would appear to an observer, the interpixel gaps in the intensity distribution between the Display Pixels A, B and C may cause dark lines or dark stripes to be observable in the boundary regions between each of the Display Pixels A, B and C. In real life, these dark lines or stripes can appear between each column of an image and extend between the top and the bottom of the image displayed using system 100.

Figure 4:
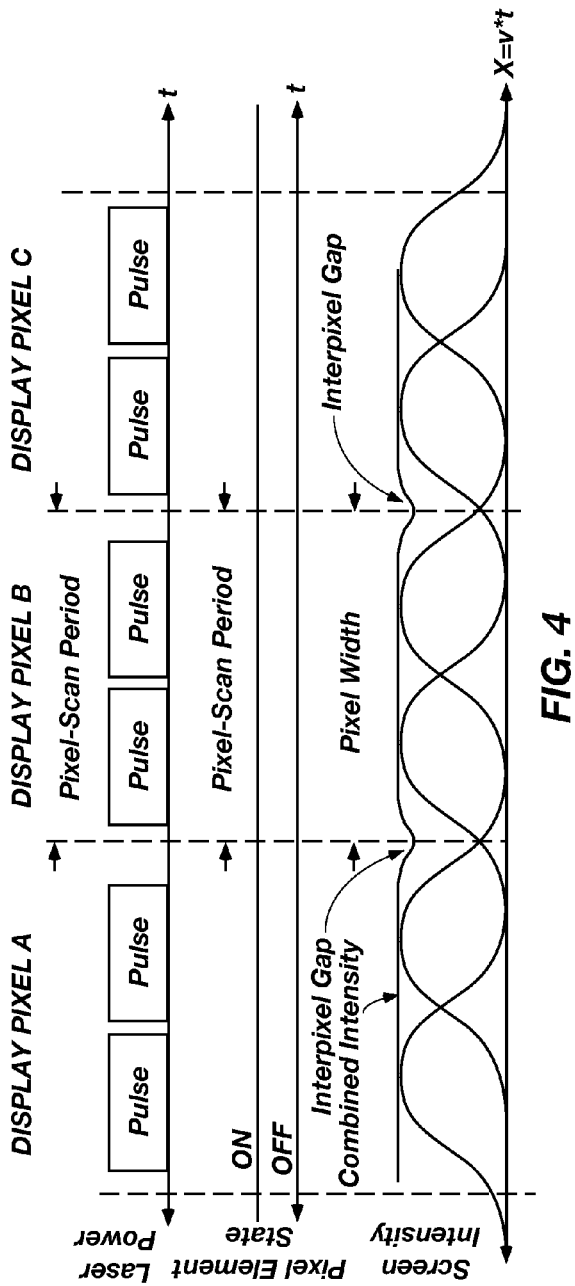
FIG. 4 is an overlay of three graphs showing the effects of using multiple pulses of light to reduce interpixel gaps between display pixels.

Turning now to FIG. 4, there is shown an overlay of three graphs for the system 100 having the same axes as described in relation to FIG. 2. However, in order to reduce the interpixel gaps in intensity between Display Pixels A, B and C, the projector controller 104 is configured to temporally offset the pulses of light from the pulsed light sources 102 during each pixel-scan period as can be seen in the top graph in FIG. 4. Further, as observed in the top graph shown in FIG. 4, these temporally offset pulses may be non-overlapping in each pixel-scan period. In an embodiment of the present disclosure, however, the temporally offset pulses may be overlapping in each pixel-scan period. Further, in an embodiment of the present disclosure, each of the pulsed light sources 102 may only pulse once during each pixel-scan period to thereby maintain a maximum power output of each of the pulsed light sources 102. Alternatively, each of the pulsed light sources 102 may pulse multiple times during each pixel-scan period.

As can be observed from the combined intensity distribution in the bottom graph of FIG. 4, the interpixel gaps in intensity between the Display Pixels A, B and C, are significantly reduced through the use of the temporally offset pulses in the pixel-scan periods. In particular, it will be appreciated that the temporally offset pulses from the pulsed light sources 102 are spatially offset from each other on the viewing surface due to the operation of the scanning device 116, which continues to move between each of the pulses in the pixel-scan periods. Thus, the intensity distributions for each of the temporally offset pulses for a given display pixel are centered at different locations on the viewing surface because the scanning device 116 remains in motion between each pulse. Nevertheless, the combined intensity distribution of the temporally offset pulses is a significant improvement over the use of only a single pulse during each pixel-scan period as shown in FIGS. 2 and 3.

It will be noted from the bottom graph of FIG. 4 that the intensity distributions may be overlapping within a display pixel even though their underlying pulses are temporally non-overlapping during the pixel-scan period. Further, the intensity distributions for a display pixel may combine with the intensity distributions of adjacent display pixels near the edges of the display pixels to further reduce the severity of the interpixel gaps between them.

Figure 5:
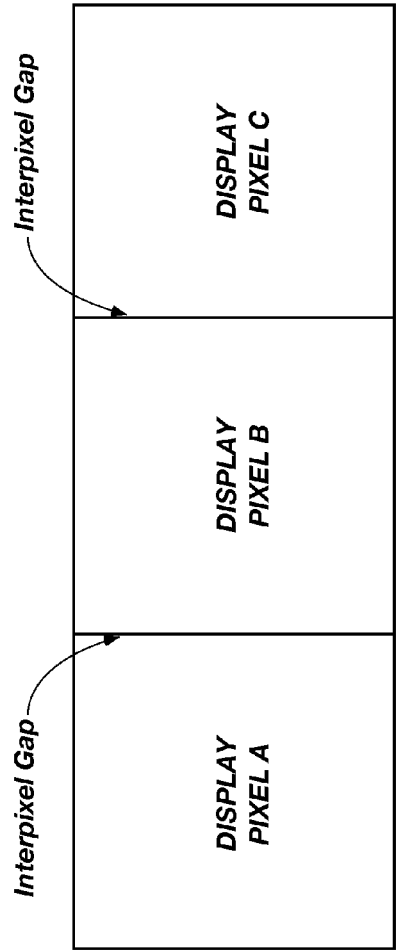
FIG. 5 is a depiction of the reduction in interpixel gaps between three adjacent pixels on a viewing surface.

FIG. 5, a representation of the appearance of the Display Pixels A, B and C on a viewing surface, illustrates the reduction in the interpixel gaps between the Display Pixels A, B and C due to the temporal spacing of the pulses within each pixel-scan period as compared to their prevalence as shown in FIG. 3.

It will be noted that it is within the scope of the present disclosure to pulse any number of temporally offset light pulses of the same color onto a pixel element of a light modulator during a pixel-scan period. In an embodiment of the present disclosure, three temporally offset pulses of the same color are pulsed onto a pixel element of a one-dimensional array of pixel elements during a single pixel-scan period. In an embodiment of the present disclosure, four or more temporally offset pulses of the same color are pulsed onto a pixel element of a one-dimensional array of pixel elements during a single pixel-scan period. In an embodiment of the present disclosure, eight or more temporally offset pulses of the same color are pulsed onto a pixel element of a one-dimensional array of pixel elements during a single pixel-scan period.

Further, each temporally offset pulse of light may be overlapping or non-overlapping in time with the other pulses of light pulsed within the same pixel-scan period. Furthermore, each temporally offset pulse may originate from a unique light source during the same pixel-scan period. That is, it is within the scope of the present invention that either a single light source generates all of the temporally offset pulses onto a pixel element of a one-dimensional array of pixel elements during a pixel-scan period; or multiple light sources may generate the temporally offset pulses onto a pixel element of a one-dimensional array of pixel elements during a pixel-scan period. In the case where there are multiple light sources, each light source may pulse only once during each pixel-scan period. Alternatively, the multiple light sources may pulse multiple times during each pixel-scan period.

Referring now back to FIG. 1, as previously discussed, the X-focus lens 112 is an exemplar anamorphic lens able to focus pulses of light onto the one-dimensional array of pixel elements on the light modulator 106. In particular, the X-focus lens 112 focuses light in a column-width direction on the pixel elements of the light modulator 106. That is, in order for the pulsed light to be focused in the X-direction, the reflective surfaces of the pixel elements lie at or very near the focal point of the X-focus lens 112. As will now be described, further reduction in the interpixel intensity gaps between adjacent display pixels on a viewing surface may be accomplished by de-focusing the light in the X-direction from the light sources 102. As will be shown below, the de-focusing of the X-focus lens 112 widens the pulses of light in the X-direction on the light modulator 106.

Figure 6:
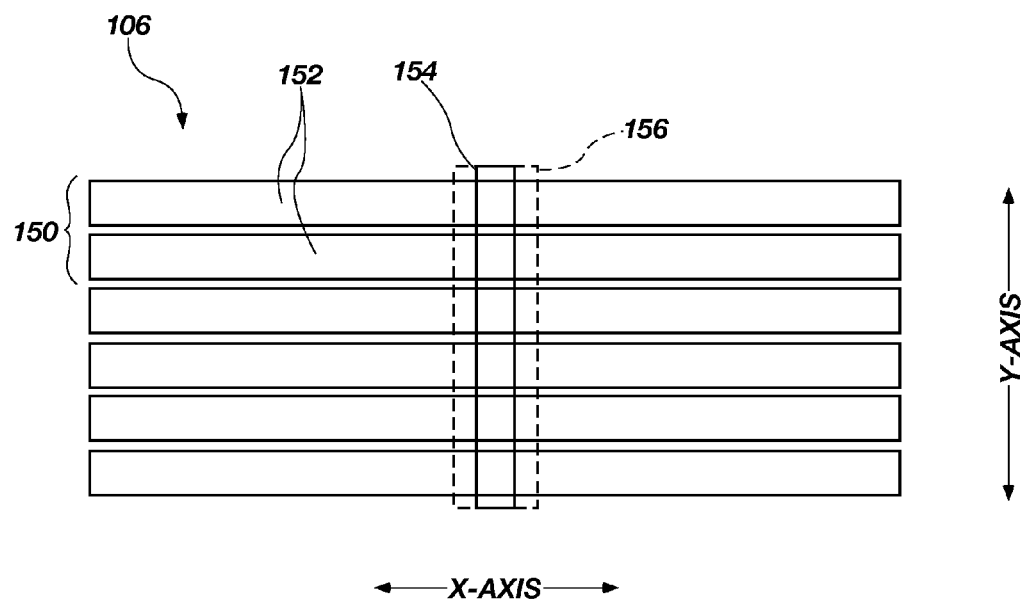
FIGS. 6 and 7 are diagrams showing the effects of de-focusing a beam of light on the surface of a light modulator.
Figure 7:
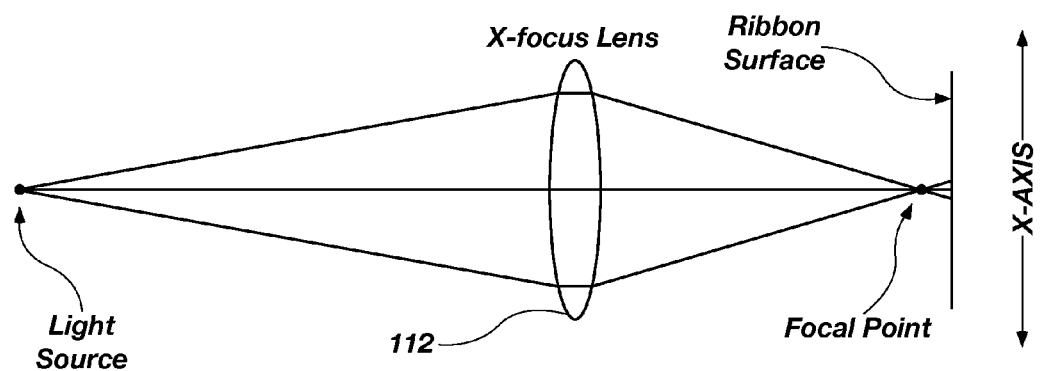

Referring now to FIGS. 6 and 7, there is shown a pixel element 150 on the light modulator 106. As previously discussed, the pixel element 150 is part of a one-dimensional array of pixel elements extending along the Y-axis. Each of the individual ribbons 152 that make up the pixel element 150 extends parallel to the X-axis. A beam of pulsed light 154 that is focused in both the X-axis and the Y-axis extends perpendicularly across each of the individual ribbons 152. By adjusting the focus of the X-focus lens 112 to thereby de-focus the beam of pulsed light in the X-direction, the width of the beam of pulsed light incident upon the pixel element 150 is wider, as indicated by the de-focused beam 156. Thus, it will be noted that the de-focused beam 156 is wider in the X-direction than that of the focused beam 154.

Figure 8:
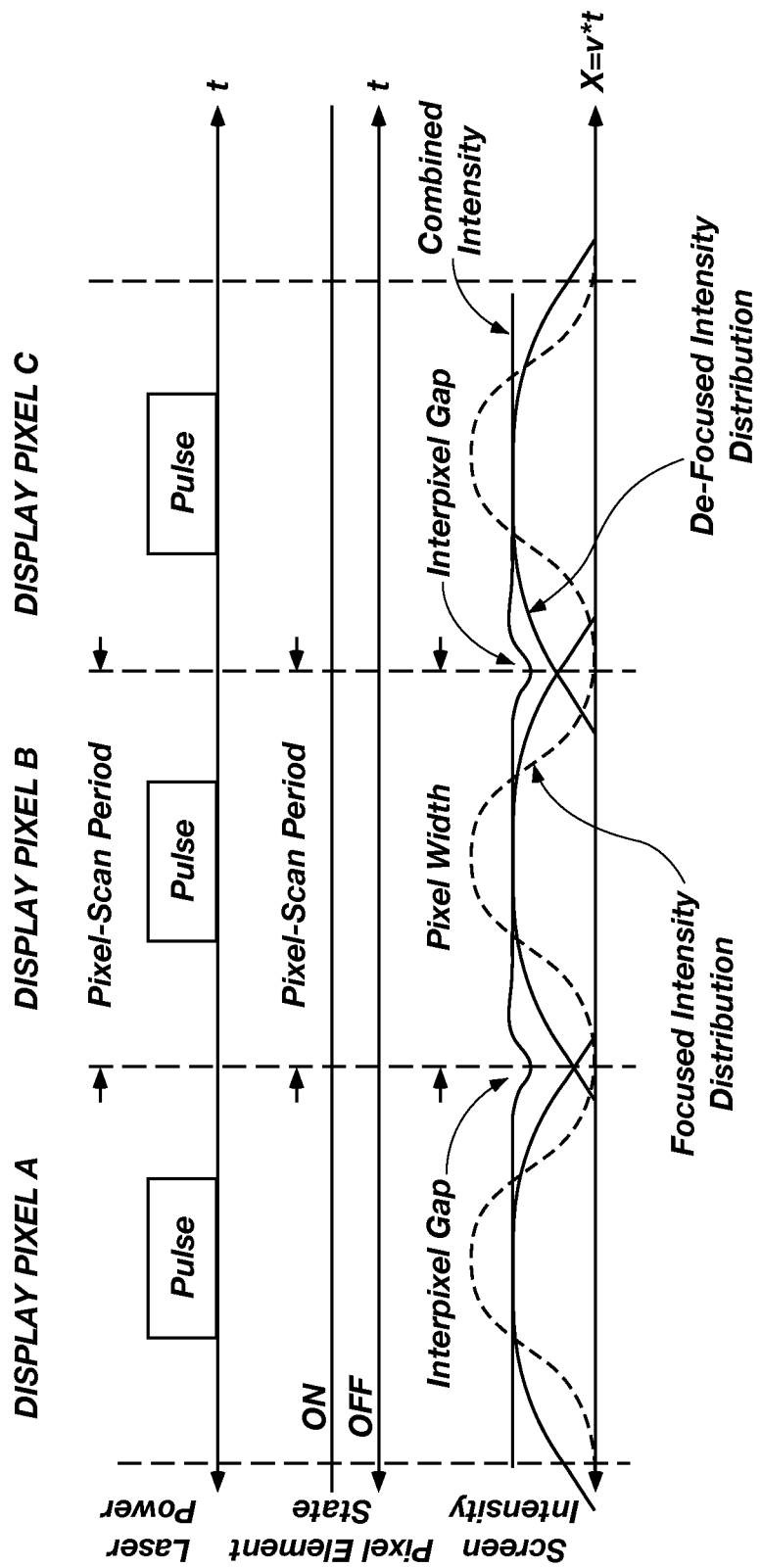
FIG. 8 is an overlay of three graphs showing the reduction in interpixel gaps caused by de-focusing the pulses of light used to form display pixels.

Referring now to FIG. 8, an overlay of three graphs, arranged similarly to that shown in FIG. 2, it can be observed that by de-focusing the light pulses in the X-direction, the interpixel gaps between Display Pixels A, B and C may be reduced. In particular, the intensity distributions for the Display Pixels A, B and C, as shown in the bottom graph of FIG. 8, are "widened" to thereby compensate for the short duty cycle of the pulses. The combined intensity distribution of the de-focused pulses reduces the interpixel gaps. However, some decrease in the overall intensity of the Display Pixels A, B and C may be observed due to the de-focusing in the X-direction. In an embodiment of the present disclosure, multiple pulses of light within a pixel-scan period may be de-focused was well.

Figure 9:
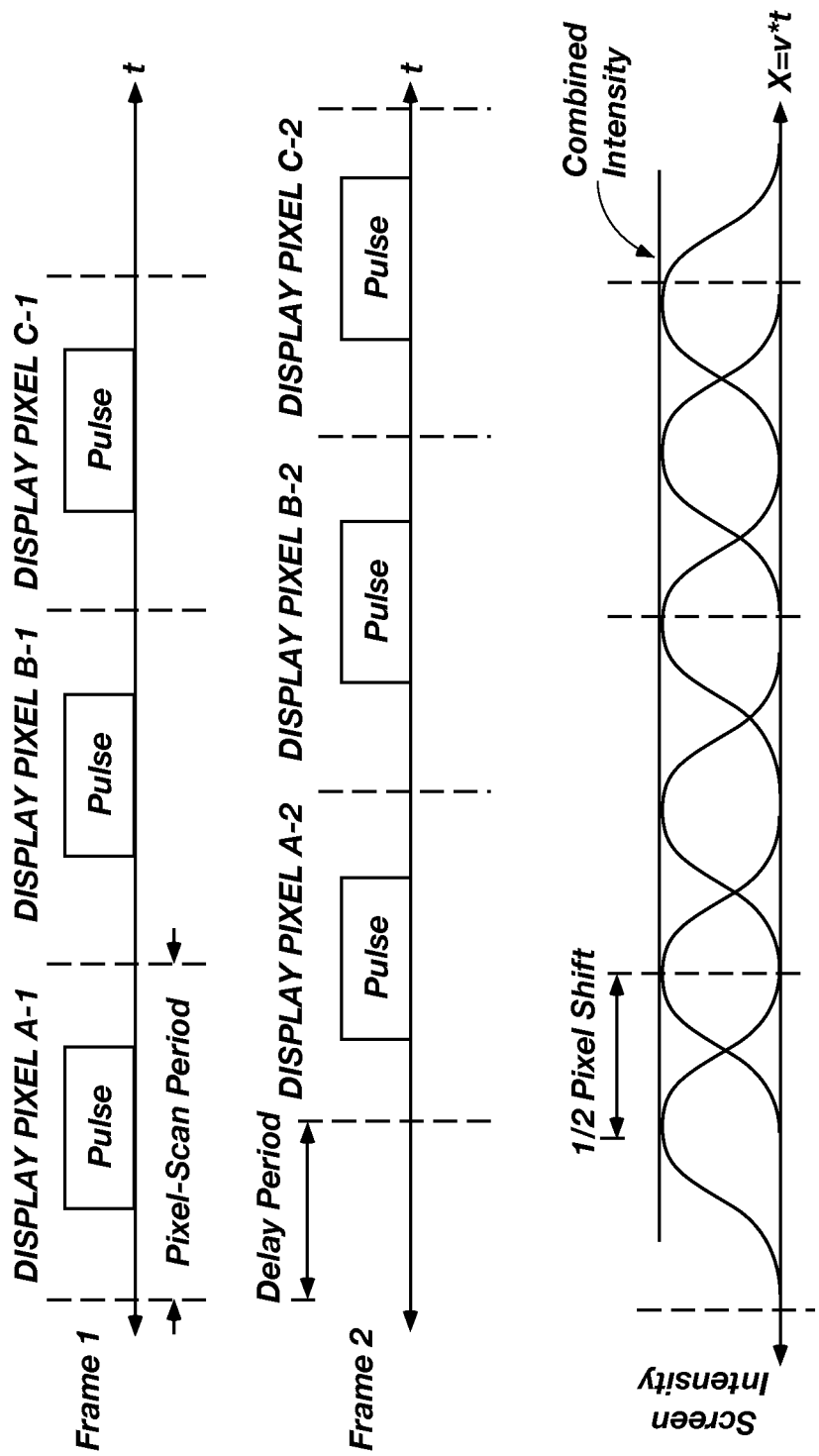
FIG. 9 is an overlay of three graphs showing two alternative frames of an image shifted by one-half of a pixel on a viewing surface.

Referring now to FIG. 9, it will now be explained that a further reduction in the interpixel gaps between display pixels on a viewing surface may be accomplished by laterally shifting the position of the display pixels in a frame of an image from the position of the display pixels in a previous frame of the image.

As previously discussed in relation to FIG. 1, a frame of an image is scanned by the scanning device 116 during a frame scan period, with each frame scan period consisting of a plurality of pixel-scan periods or column-scan periods. In order to ensure that each subsequent frame of an image is positioned exactly on the previous frame of the image, the system 100 initiates the scan of each frame when the scanning device 116 is in the same position. Stated another way, because the scanning device 116 is typically operated at a constant frequency, the projector controller 104 starts scanning each new frame at a predetermined time (or based upon feedback from the scan mirror or based upon a video sync signal) such that the scanning device 116 is at the same initial location to begin scanning each frame. However, by purposefully delaying the start of a frame scan period for alternate frames of an image, a reduction in the interpixel gaps may be accomplished, as will now be explained below.

FIG. 9 illustrates the scanning of two frames of an image, namely Frames 1 and 2. Frame 1 comprises Display Pixels A-1, B-1, and C-1 and Frame 2 comprises Display Pixels A-2, B-2 and C-2. Display Pixels A-1 and A-2 in Frames 1 and 2 are related in that they define the same location in the source data for the images in Frames 1 and 2. That is, Display Pixel A-2 is intended to replace Display Pixel A-1 in the same location on the viewing surface as defined by the source data if Frames 1 and 2 were shown as intended. Display Pixels B-1 and B-2 and Display Pixels C-1 and C-2 are similarly related.

The scanning of Frame 1 is commenced when the scanning device 116 is at a predetermined initial position. Once Frame 1 is completely scanned across the viewing screen, the scanning device 116 returns to the initial position at a predetermined frequency. However, the beginning of the scanning of Frame 2 is delayed by a Delay Period such that the scanning device 116 has moved past the initial position used for Frame 1 when Frame 2 actually begins scanning. This delay in the beginning of the scanning of Frame 2 will laterally shift the entire image of Frame 2 on the viewing surface. In an embodiment of the present disclosure, the Delay Period is such that Frame 2 is shifted by approximately one-half of a pixel on the viewing surface with respect to Frame 1. The Delay Period may be repeated for every other frame of the image. Thus, Frame 3 (not shown) would begin scanning when the scanning device 116 is at the same initial position as for Frame 1, while the scanning of Frame 4 (not shown) would be delayed in a manner similar to Frame 2. The delayed frames and the un-delayed frames may be interlaced, i.e., the scanning of every other frame of an image may be delayed.

The delay in scanning between alternate frames of an image may result in a reduction of the interpixel intensity gaps between adjacent pixels and columns as shown in the bottom graph of FIG. 9. In particular, the display pixels for the delayed frames are approximately centered on the interpixel gaps from the un-delayed frames and vice-versa. It will be noted that the frame shift on the viewing surface may be more or less than one-half of a display pixel.

Figure 9A:
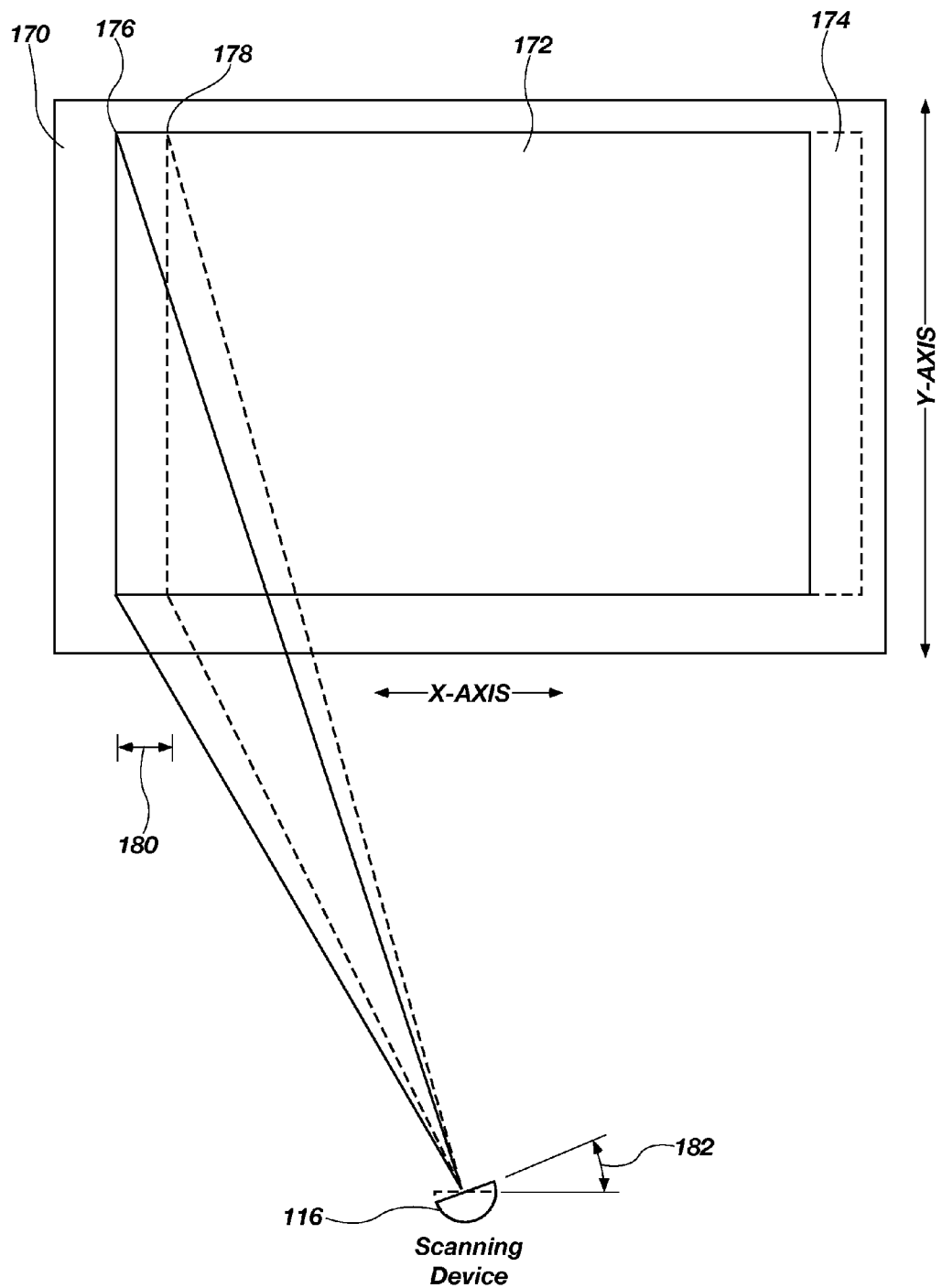
FIG. 9A is a depiction of two alternate frames of an image shifted by one-half of a pixel on a viewing surface.

Referring now to FIG. 9A, there is shown the scanning device 116 in relation to a viewing surface 170. A first frame 172 of an image is depicted on the viewing surface 170. For simplicity of representation, a second frame 174 of an image is also depicted on the viewing surface 170, even though in operation they would not be scanned at the same time onto the viewing surface 170. Thus, it will be appreciated that the first frame 172 and the second frame 174 are scanned sequentially onto the viewing surface 170. As previously discussed, the scanning device 116 scans a frame of an image during a sweep of the viewing surface 170 and then returns to its original position to begin the scanning of the next frame. Ideally, the sweeping of the viewing surface 170 by the scanning device 116 occurs at a constant frequency.

The projector controller 104 initiates the scanning of frame 172 at location 176 on the viewing surface 170 during a sweep by the scanning device 116. After the scanning device 116 has returned to sweep the next frame, i.e., frame 174, the projector controller 104 delays initiating the scanning of frame 174 until the scanning device 116 has moved past the position 176 and begins scanning frame 174 at location 178 on the viewing surface 170. The offset distance 180 between the position of frames 172 and 174 on the viewing surface 170 may be less than one-pixel width or approximately one-half of a pixel. The difference in position of the scanning device 116 between the scanning of frames 172 and 174 may be represented angularly by angle 182. Because the scanning device 116 is operating at a known frequency, the projector controller 104 may use a simple time delay to offset frames 172 and 174 on the viewing surface 170.

Figure 10:
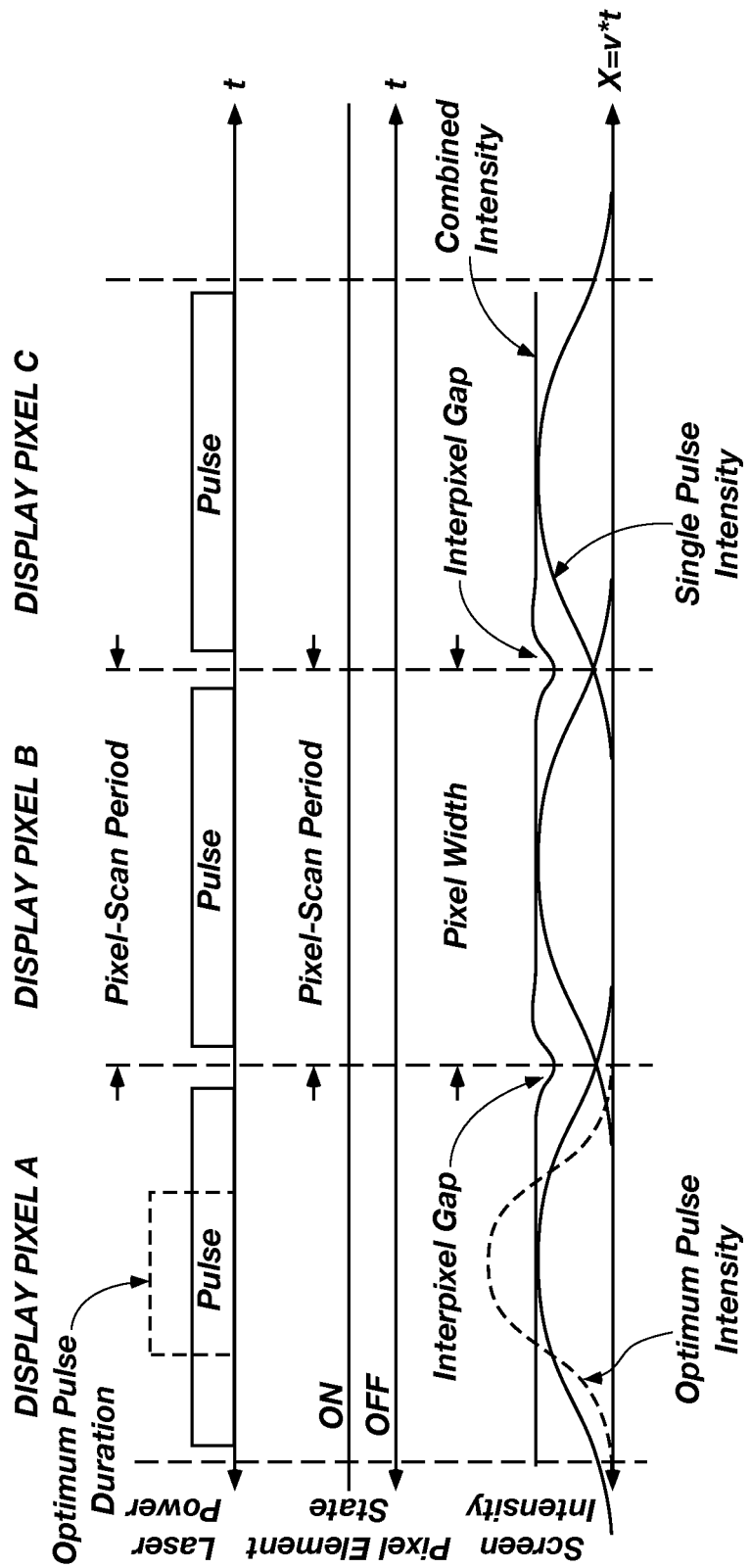
FIG. 10 is an overlay of three graphs showing the effects of increasing the duty cycle of pulses of light used to form display pixels on a viewing surface.

Referring now to FIG. 10, an overlay of three graphs similar to FIG. 2, the interpixel intensity gaps between adjacent display pixels may be further reduced by increasing the duty cycle of the pulsed light sources 102 such that the pulse duration is longer than the optimum pulse duration for the pulsed light sources 102. In other words, the interpixel gaps may be reduced by pulsing each of the light sources 102 for a longer duration during each pixel-scan period than the optimum pulse duration. A disadvantage to this approach is that the increase in the pulse duration of the light sources 102 may cause a drop in their light intensity output. In an embodiment of the present disclosure, the light sources 102 are operated at more than 10%, 20%, 30% or 40% of their optimum pulse duration. In another embodiment of the present disclosure, the light sources 102 are pulsed at more than 60%, 70%, 80%, or 90% of their optimum pulse duration.

Figure 11:
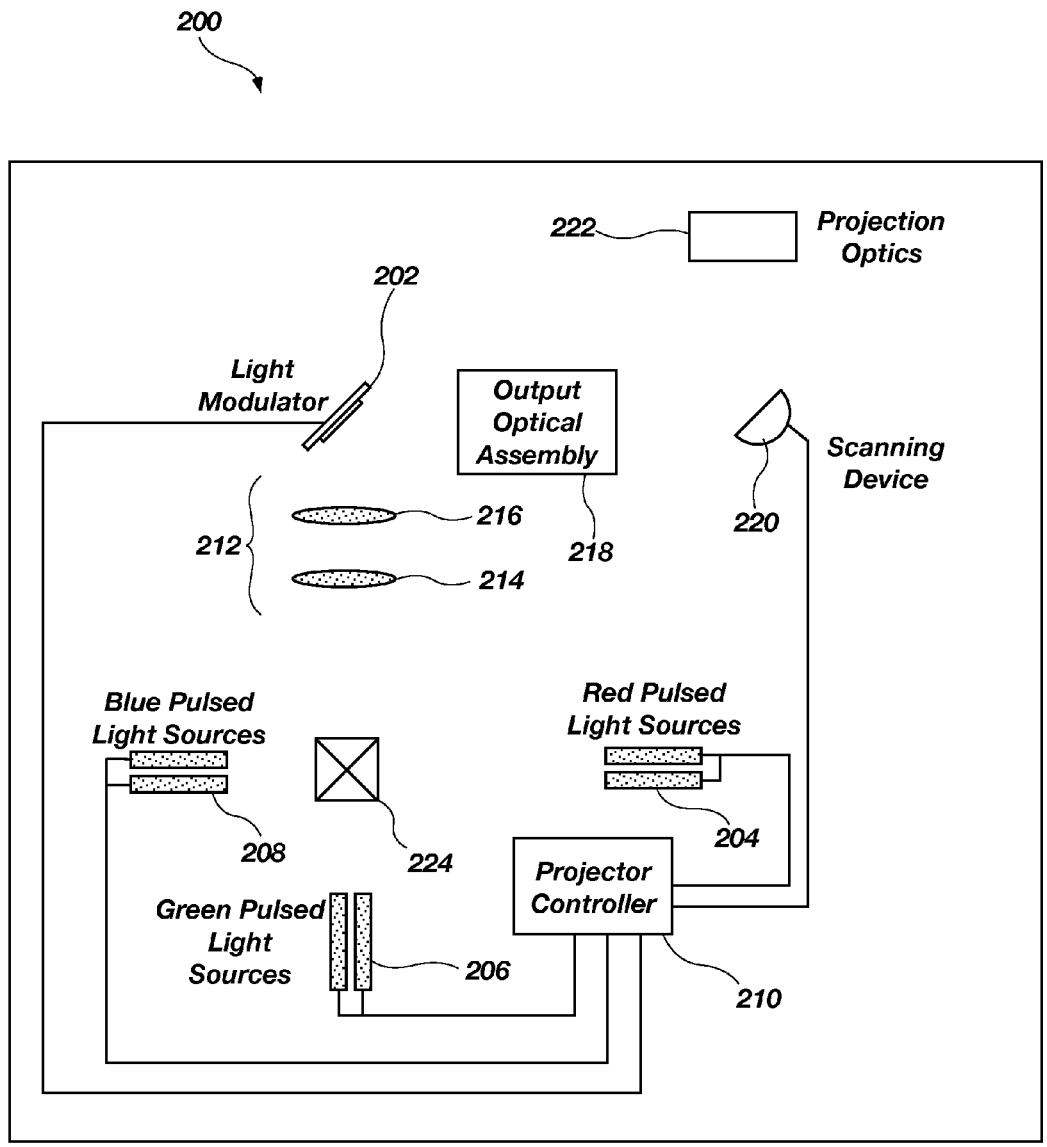
FIG. 11 is a diagram of a display system pursuant to an exemplary embodiment of the present disclosure.

Referring now to FIG. 11, there is depicted a system 200 for forming an image on a viewing surface. The system 200 may be operable to scan, in full-color, the columns of an image as described in U.S. patent application Ser. No. 12/001,771 ("the '771 application"), filed on Dec. 12, 2007, which application is hereby incorporated by reference in its entirety. In particular, the system 200 may include a light modulator 202 for modulating incident light emitted from red pulsed light sources 204, green pulsed light sources 206, and blue pulsed light sources 208. The system 200 may further include a projector controller 210, an input optical assembly 212 having a Y-collimating lens assembly 214 and an X-focus lens 216, an output optical assembly 218, a scanning device 220 and projection optics 222. The function and operation of the input optical assembly 212, Y-collimating lens assembly 214, X-focus lens 216, output optical assembly 218, scanning device 220 and projection optics 222 are similar to those like-named components described above in reference to FIG. 1, and will not be repeated in detail here.

Still referring to FIG. 11, the projector controller 210 may be operable to pulse each of the red pulsed light sources 204, green pulsed light source 206, and blue pulsed light sources 208, in synchronization with the light modulator 202 and scanning device 220, which may also be controlled by the projection controller 210. The system 200 may further include an optical device 224 for directing the light from the red pulsed light sources 204, the green pulsed light sources 206, and the blue pulsed light sources 208 into the input optical assembly 212.

As mentioned, the system described in the '771 application scans full-color columns onto a viewing surface using only a single light modulator. As described in the '771 application, this operation may be primarily accomplished by pulsing light from a red light source, a green light source and a blue light source onto a light modulator during each column-scan period. As further described in '771 application, between each of the colored light pulses during a pixel-scan period or a column-scan period, the light modulator is reconfigured to modulate the next pulse. As further described in '771 application, to account for the temporal separation between each of the light pulses during a column-scan period and the constant movement of the scanning device, each of the different colored light pulses is spatially offset on the pixel elements of the light modulator.

The system described in '771 application, however, does not take into account the use of pulsed laser sources that have short optimum pulse durations. As will now be described, the system 200 provides improvements over the system disclosed in '771 application as system 200 is able to scan each column in full color using light sources that have short optimum pulse durations.

Figure 12:
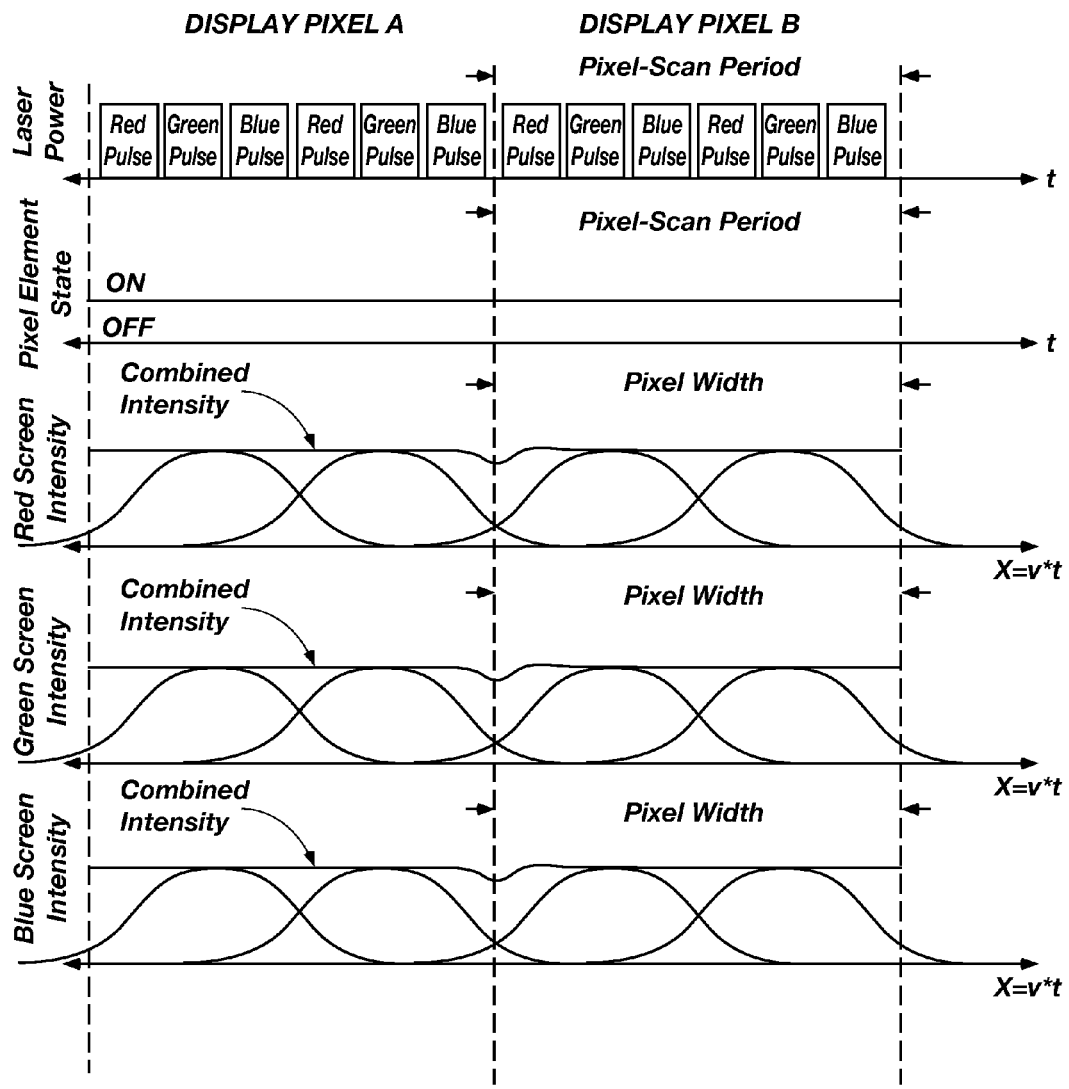
FIG. 12 is an overlay of five graphs showing the effects of pulsing each primary color multiple times during each pixel-scan period.

Referring now to both FIGS. 11 and 12, there is depicted an overlay of five graphs in relation to two display pixels, namely Display Pixels A and B. As can be observed in the top graph in FIG. 12, the red pulsed light sources 204 generate two temporally offset pulses onto the pixel element during each pixel-scan period. Likewise, the green pulsed light sources 206 and the blue pulsed light sources 208 each generate two temporally offset pulses onto the pixel element during each pixel-scan period. Further, the red, green and blue pulses generated during each pixel-scan period are also temporally offset from each other. In an embodiment of the present disclosure, it will be appreciated that the same colored light pulses may be overlapping in time during each pixel-scan period. It will be further appreciated that the individual light sources that form each of the pulsed light sources 204, 206 and 208 may be pulsed collectively or individually during each pixel-scan period.

As can be observed in the second graph in FIG. 12, the pulses of light from the pulsed light sources 204, 206 and 208 are pulsed onto the same pixel element of the light modulator 202. In the second graph, the pixel element is depicted as remaining in the same state during each pixel-scan period as may be the case to generate two adjacent white pixels. It will be appreciated, however, that the pixel element may change configuration between each pulse of light in the same pixel-scan period to thereby generate different colored display pixels on the viewing surface.

As may be observed in the third graph of FIG. 12, the intensity distributions for the two red pulses are spatially offset on the viewing surface for each of the Display Pixels A and B. As may be further observed from the third graph, the combined intensity of the two spatially offset red pulses for each of Display Pixels A and B reduce the interpixel intensity gap between the Display Pixels A and B. As can be observed from the fourth and fifth graphs in FIG. 12 (labeled "Green Screen Intensity" and "Blue Screen Intensity"), respectively, the same observation holds true for the green pulses and the blue pulses. As a result of pulsing each colors' light sources more than once during each pixel-scan period, the colors are more evenly distributed in each Display Pixel A and B on the viewing surface.

Figure 13:
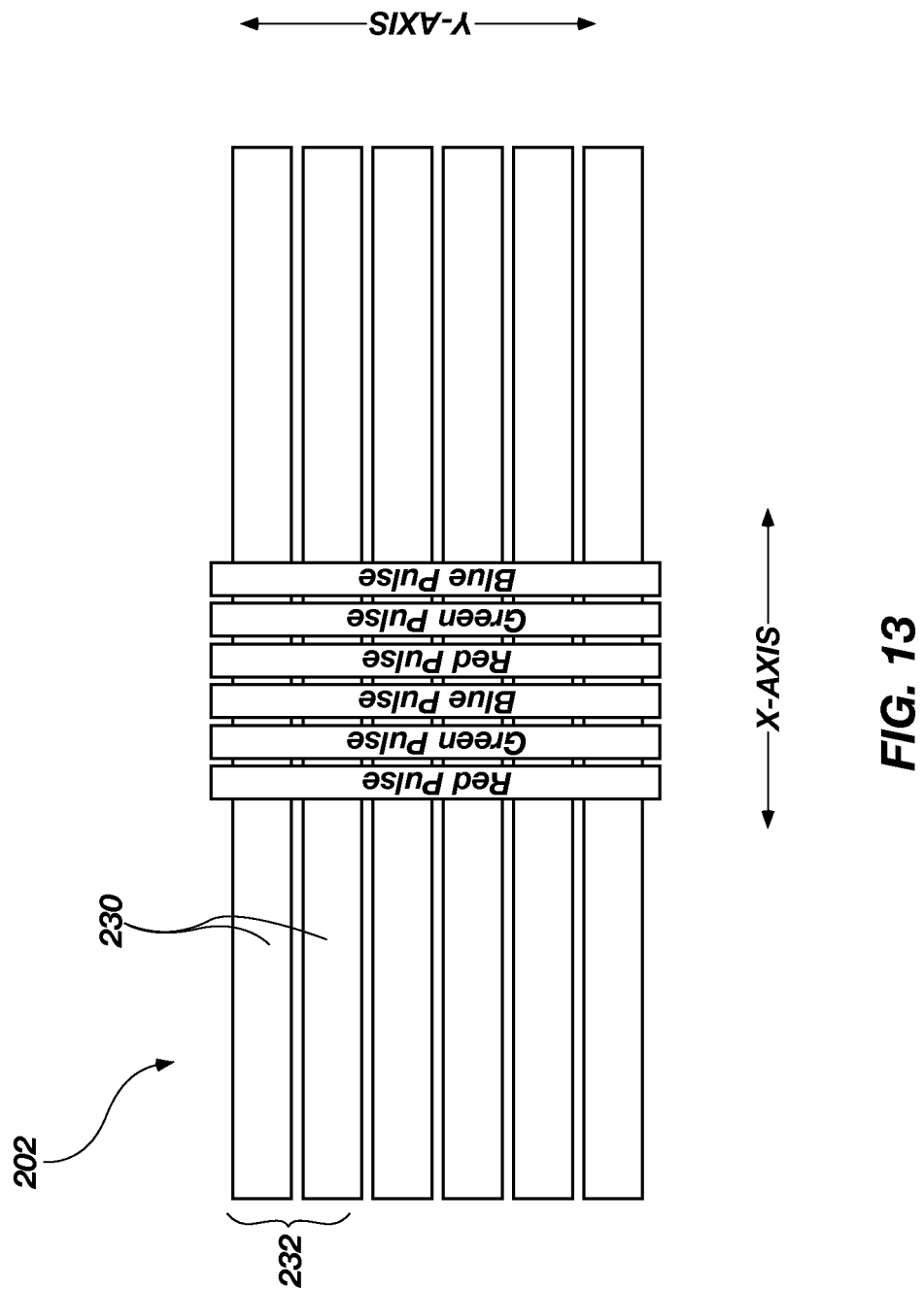
FIG. 13 is a depiction of the spatial separation of different pulses of light on the surface of a light modulator.

Referring now to FIG. 13, in order to ensure that each of the separate pulses of light incident on the pixel element during a pixel-scan period is scanned to the correct location on the viewing surface, each of the red, green and blue pulses of light may be spatially offset in the X-direction on the ribbons 230 of the pixel element 232 on the light modulator 202. Although the pulses are shown as non-overlapping in location on the ribbons 230, it will be appreciated that the pulses may be over-lapping in location on the ribbons 230. Further, although all of the pulses are shown together on the ribbons 230 in FIG. 13, it will be appreciated that the pulses are temporally offset from each other such that only one pulse is incident on the ribbons 230 of the pixel element 232 at any one time.

Further, the sequential order in which the pulses are pulsed onto the ribbons 230 may be varied from red, green, blue, red, green, blue as shown in FIG. 12. For example, the light sources 204, 206 and 208 may generate a series of temporally offset pulses during a pixel-scan period that take the sequence of: red, red, green, green, blue, blue. It will therefore be appreciated that any other sequential pulsing of the different colors of light onto a pixel element during a pixel-scan period falls within the scope of the present invention. Likewise, while only two pulses for each color of light are shown in FIG. 12 as being incident on the pixel element 232 during a single pixel-scan period, it will be appreciated that any number of pulses of the same color may be used. Further, each pulse of light incident on the pixel element 232 during a pixel-scan period may be generated by a group of light sources or a single light source.

The system 200 depicted in FIG. 11 may employ the other techniques described herein for reducing the interpixel gaps between adjacent pixels and columns on a viewing surface. For instance, in addition to temporally offsetting pulses of the same color during a column-scan period or a pixel-scan period, the pulses of light generated by the light sources 204, 206 and 208 may be de-focused in the X-direction by adjusting the position of the X-focus lens 216. Also, the duty cycle of the light sources 204, 206 and 208 may be increased with respect to the pixel-scan period such that a pulse duration is longer than an optimum pulse duration for the light sources 204, 206 and 208. Further, the frame scan period between alternating frames of an image may be delayed with respect to the position of the scanning device 220 to thereby offset the frames on the viewing surface.

Figure 14:
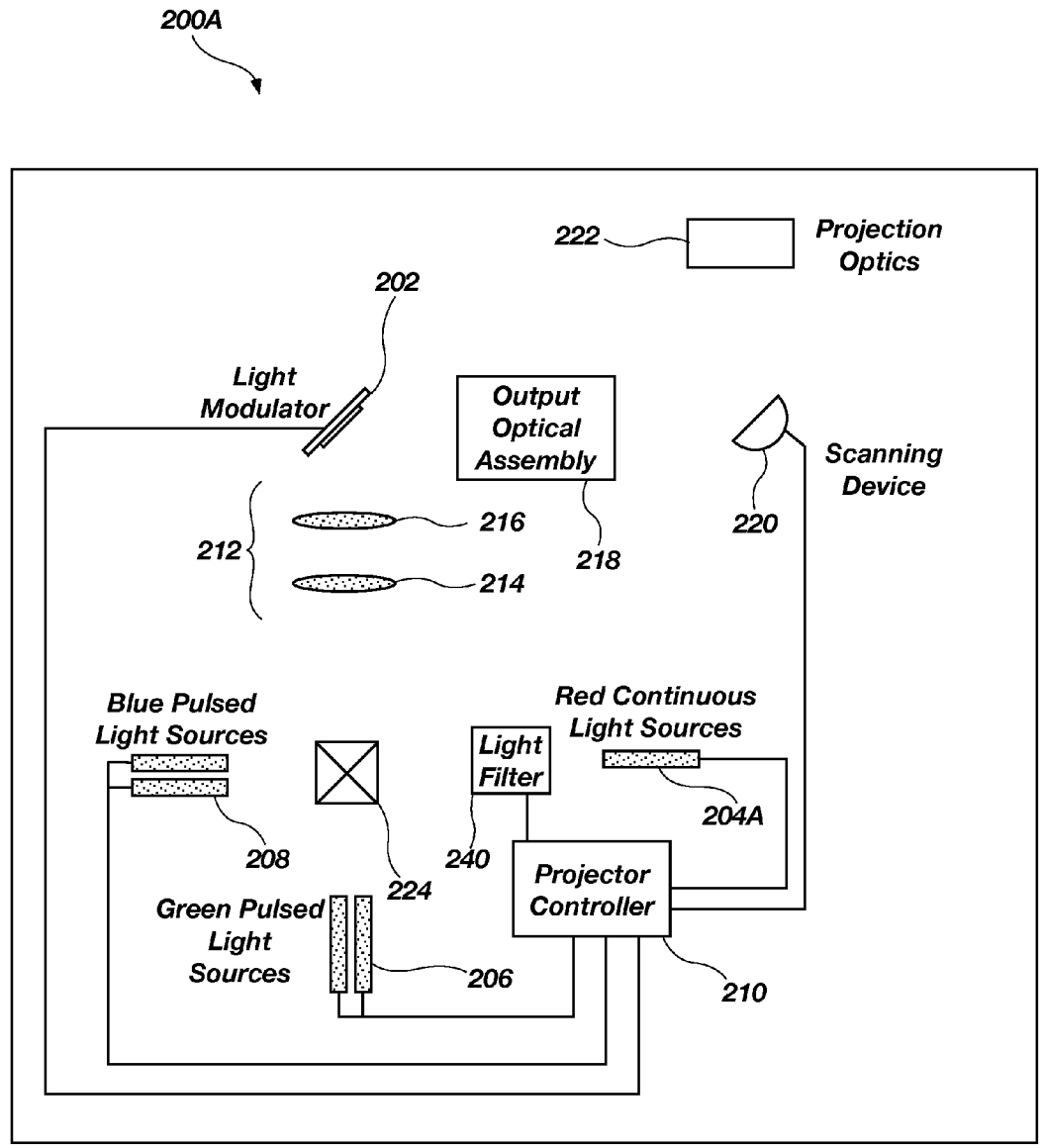
FIG. 14 is a diagram of a display system pursuant to an exemplary embodiment of the present disclosure.

Referring now to FIG. 14, there is depicted a display system 200A, where like reference numerals depict components similar to those described in connection with system 200 shown in FIG. 11 (and FIG. 1). The system 200A is modified from system 200 in that in place of the red pulsed light sources 204 in FIG. 11, the system 200A includes a red continuous light source 204A and a light filter 240. The red continuous light source 204A may be a continuous laser light source as is known to one having ordinary skill in the art. The use of a red continuous light source 204A in conjunction with the green pulsed light sources 206 and the blue light sources 208 may be desirable in the event that a pulsed red light source 204 as shown in FIG. 11, for example, is not found suitable for use with the system 200.

The light filter 240 may be a device able to cause the red continuous light source 204A to mimic or simulate a pulsed light source in the system 200A. It will be understood that the light filter 240 may include any device able to selectively prevent light from the red continuous light source 204A from striking the light modulator 202.

In an embodiment of the present disclosure, the light filter 240 may include an acousto-optic modulator ("AOM") operable to diffract light emitted from the red continuous light source 204A. In particular, as light from the red continuous light source 204A passes through the AOM, and the AOM is activated, the light will be diffracted and scattered. The diffracted and scattered light does not reach the light modulator 202 and the red continuous light source 204A is effectively off. When the AOM is not activated, the light from the red continuous light source 204A passes freely through the AOM without obstruction to thereby strike the light modulator 202. In an embodiment of the present disclosure, the light filter 240 may include a spinning structure with holes or spokes to selectively allow light to pass. In an embodiment of the present disclosure, the light filter 240 may include an electro-optical switch, such as a Pockels cell. In an embodiment of the present disclosure, the light filter 240 may include a Galvanometer scanner. In an embodiment of the present disclosure, the light filter 240 may be omitted and the seed laser from the red continuous laser 204A could be pulsed. The system 200A may be operable to reduce interpixel gaps between adjacent pixels using any of the methods described herein.

It will be appreciated that in an embodiment of the present disclosure, the continuous light source used in combination with pulsed light sources may emit light other than red as depicted in FIG. 14. In an embodiment of the present disclosure the continuous light source used in combination with pulsed light sources may emit green light, blue light or light of some other color. In an embodiment of the present disclosure, the pulsed light sources depicted in FIGS. 11 and 14 may emit light other than the colors indicated in the figures and related discussion. Thus, as used herein, the term "light source" may mean a pulsed light source or a continuous light source emitting light of any color.

It will be further appreciated that the concept of forming a display pixel on a viewing surface may mean forming the display pixel on a viewing surface in a single color or in full color. Further, the concept of forming a display pixel on a viewing surface may mean forming the display pixel in a single underlying color of a full color display pixel. For example, the concept of forming a display pixel on a viewing surface may mean forming one of a red, blue, or green component of a full color pixel.

Figure 15:
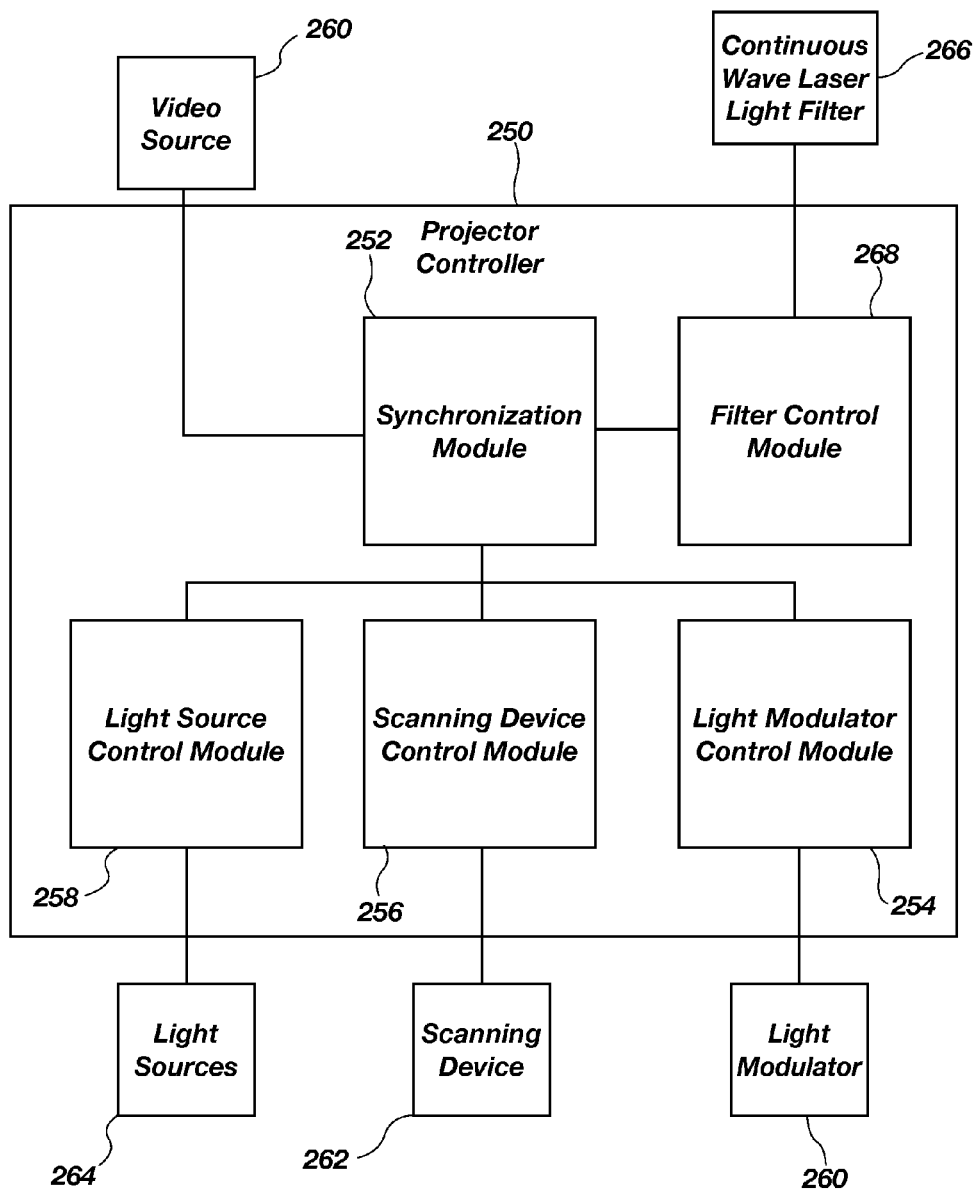
FIG. 15 is a block diagram of a projection controller pursuant to an exemplary embodiment of the present disclosure.

Referring now to FIG. 15, there is depicted a block diagram of an exemplary projection controller 250 pursuant to an embodiment of the present invention. The projection controllers 104 (FIG. 1) and 210 (FIGS. 11 and 14) may take substantially the form of the projection controller 250. The projection controller 250 may comprise a synchronization module 252, a light modulator control module 254, a scanning device control module 256, a light source control module 258 and an optional filter control module 268. The light modulator control module 254 may control the operation of the individual pixel elements on a light modulator 260 in accordance with image data from a video source 260. The scanning device control module 256 may control the operation of a scanning device 262. Further, the scanning device control module 256 may provide position feedback information regarding the position of the scanning device 262 such that the position of the scanning device 262 may determined and controlled. The light source control module 258 may control one or more light sources 264, including pulsed laser light sources and continuous laser light sources. In operation, the video source 260 provides data to the synchronization module 252, which may include a video clock signal. The video source 260 may also provide data, such as image data, to the light modulator control module 258. The image data may be utilized to configure pixel elements on the light modulation device 260 such that display pixels are shown at the proper intensity and color. The filter control module 268, when present, may control a continuous wave laser light filter 266 to thereby provide laser pulses from a continuous wave laser.

The synchronization module 252 assists in generating an image on a viewing surface from the image data provided by the video source 260 by coordinating and synchronizing the operations of the light modulator control module 254, the scanning device control module 256, the light source control module 258, and the filter control module 268 to thereby reduce interpixel gaps as described herein. For example, the synchronization module 252 may ensure that the light sources 264 are correctly pulsed during column or pixel-scan periods and that the light modulator 260 is correctly configured. Thus, the projection controller 250 may be operable to reduce interpixel gaps between columns (or rows) of a display pixels as described in detail herein by causing the light sources 264 to provide a plurality of temporally offset pulses during a column or pixel-scan period or by shifting the start position of a new frame on a viewing surface with respect to a previous frame such that the columns of the new frame and the previous frame are offset from each other. In addition, the projection controller 250 may pulse light sources longer than their optimum pulse duration during a pixel or column-scan period.

It will be appreciated that the structure and apparatus disclosed herein is merely one example of a means for reducing interpixel gaps on a viewing surface and it should be appreciated that any structure, apparatus or system which performs functions the same as, or equivalent to, those disclosed herein are intended to fall within the scope of a means for reducing interpixel gaps on a viewing surface, including those structures, apparatus or systems which are presently known, or which may become available in the future. Anything which functions the same as, or equivalently to, a means for reducing interpixel gaps on a viewing surface is intended to fall within the scope of this element.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like which may now be available or which may become available in the future.

Modules may also be implemented in hardware in combination with software code, sometimes referred to as computer readable instructions, for execution by various types of processors. An identified block of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a block of executable code may be a single instruction, or many instructions, and may even be distributed over several different code segments, among different programs, and across several memory devices that are coupled to a processor. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The projection controller 250 may, in addition to comprising various modules, take the form of a module as described above.

Figure 16:
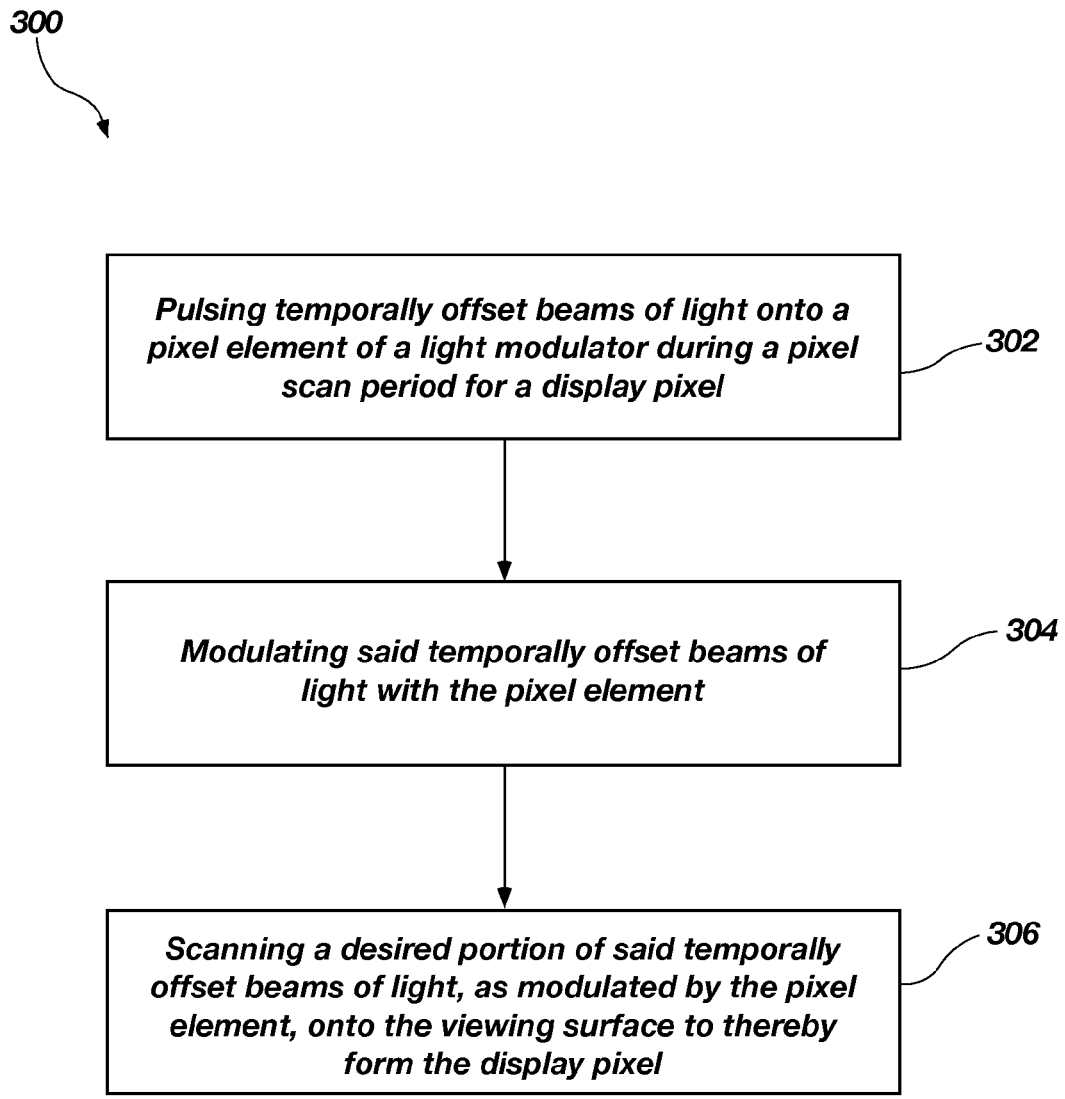
FIG. 16 depicts a high-level flow diagram of a process of displaying an image on viewing surface according to an embodiment of the present disclosure.

Referring now to FIG. 16, there is depicted a high-level flow diagram of a process 300 for displaying an image on viewing surface according to an embodiment of the present disclosure. At block 302, a projection controller may pulse temporally offset beams of light from one or more laser light sources onto a pixel element of a light modulator during a pixel-scan period associated with a display pixel. The pixel-scan period may be dependent upon the time required by a scanning device to sweep once through an angle that covers the display pixel area on a viewing surface. At block 304, the light modulator may modulate the temporally offset beams of light using the pixel element. For example, the pixel element may be configured based upon image data from an image source to thereby form the required light intensity for the display pixel on a viewing surface. At block 306, a desired portion of the temporally offset beams of light, as modulated by the pixel element, is scanned on the viewing surface to thereby form the display pixel.

Figure 17:
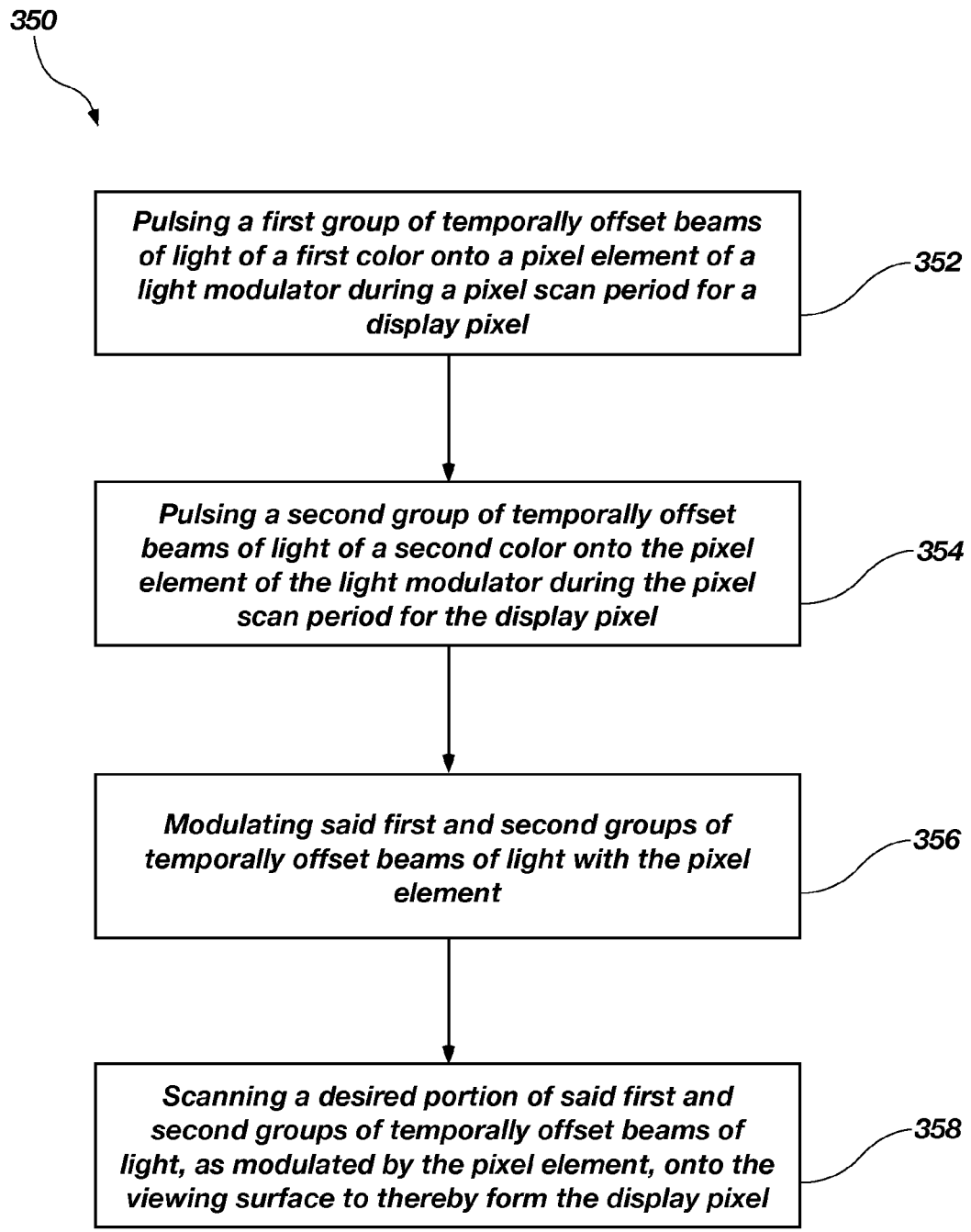
FIG. 17 depicts a high-level flow diagram of a process of displaying an image on viewing surface according to an embodiment of the present disclosure.

Referring now to FIG. 17, there is depicted a high-level flow diagram of a process 350 of displaying an image on viewing surface according to an embodiment of the present disclosure. At block 352, a projection controller may pulse a first group of temporally offset beams of light of a first color onto a pixel element of a light modulator during a pixel-scan period for a display pixel. At block 354, the projection controller may pulse a second group of temporally offset pixel elements of light of a second color onto the pixel element of the light modulator during the pixel-scan period for the display pixel. At block 356, the first and second group of temporally offset beams of light may be modulated by the pixel element. At block 358, a scanning device may scan a desired portion of the first and second groups of temporally offset beams of light, as modulated by the pixel element, onto the viewing surface to thereby form the display pixel.

Figure 18:
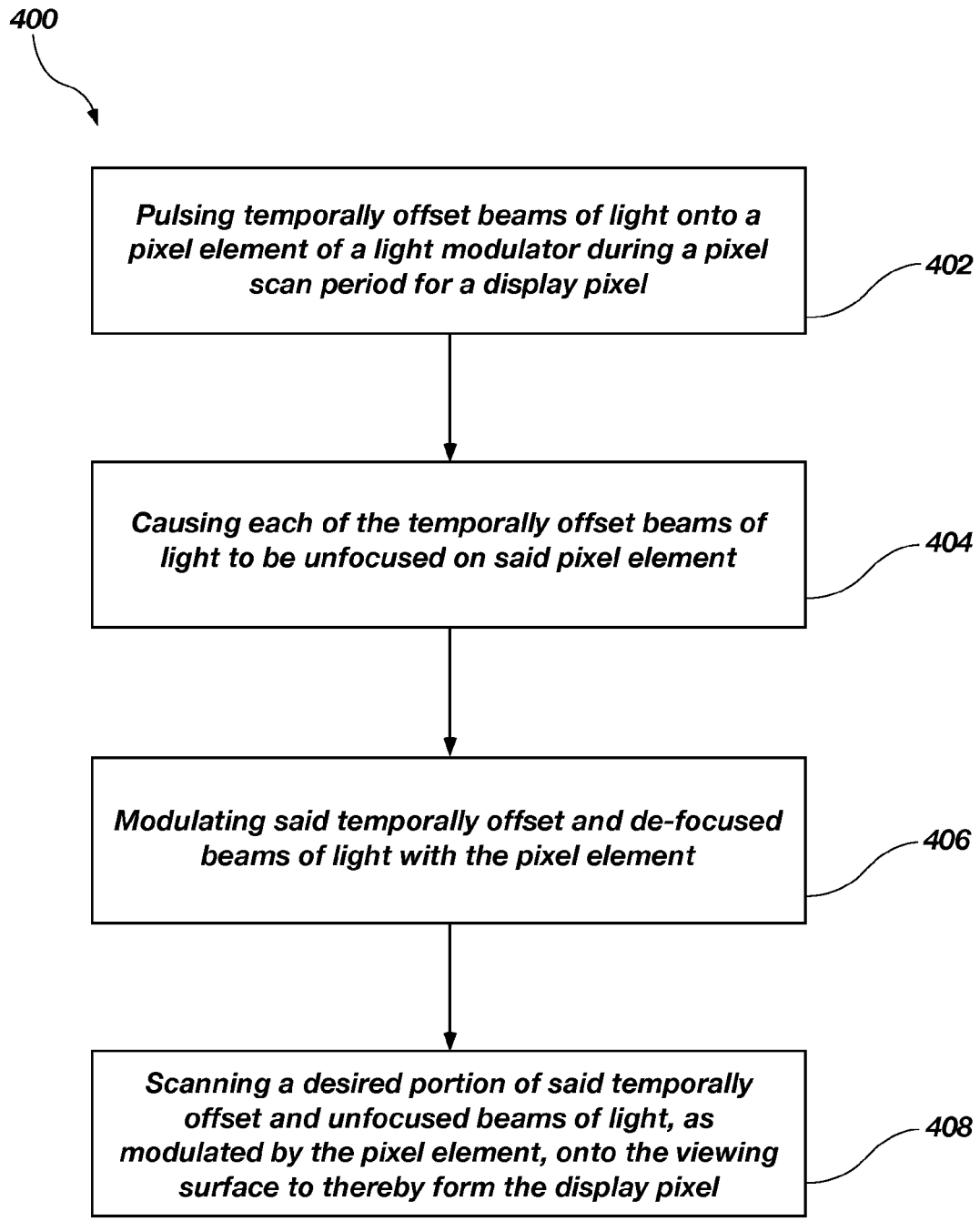
FIG. 18 depicts a high-level flow diagram of a process of displaying an image on viewing surface according to an embodiment of the present disclosure.

Referring now to FIG. 18, there is depicted a high-level flow diagram of a process 400 of displaying an image on viewing surface according to an embodiment of the present disclosure. At block 402, a projection controller may pulse temporally offset beams of light onto a pixel element of a light modulator during a pixel-scan period for a display pixel. At block 404, the beams of temporally offset beams of light may be unfocused on the pixel element. At block 406, the unfocused beams of light may be modulated by the pixel element. At block 408, a desired portion of the temporally offset and unfocused beams of light, as modulated by the pixel element, may scanned onto a viewing surface to thereby form the display pixel.

Figure 19:
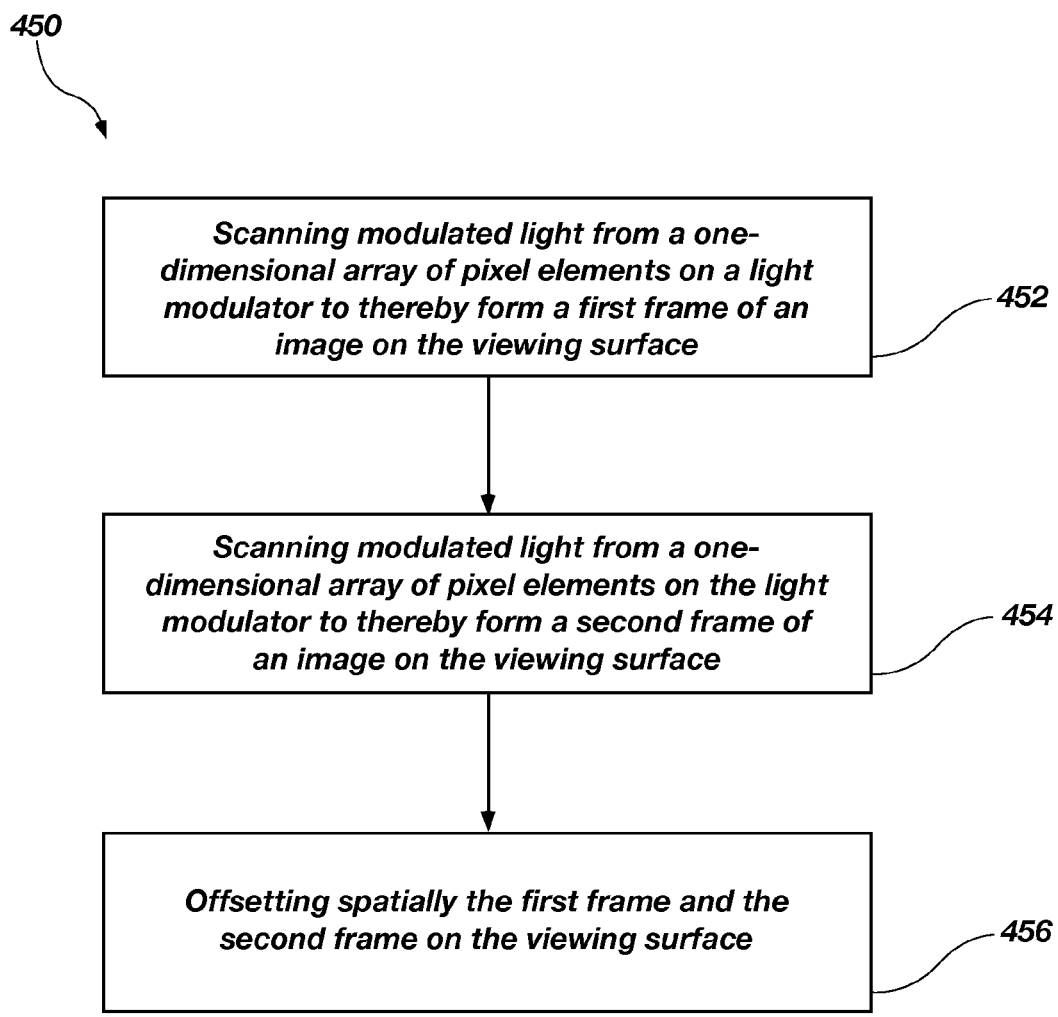
FIG. 19 depicts a high-level flow diagram of a process of displaying an image on viewing surface according to an embodiment of the present disclosure.

Referring now to FIG. 19, there is depicted a high-level flow diagram of a process 450 of displaying an image on viewing surface according to an embodiment of the present disclosure. At block 452, modulated light may be scanned by a scanning device onto a viewing surface to thereby form a first frame of an image. At block 454, modulated light may be scanned by the scanning device onto the viewing surface to thereby form a second frame of the image. At block 456, the first frame and the second frame of the image, which may be frames of a motion picture, are offset from each other on the viewing surface.

Figure 20:
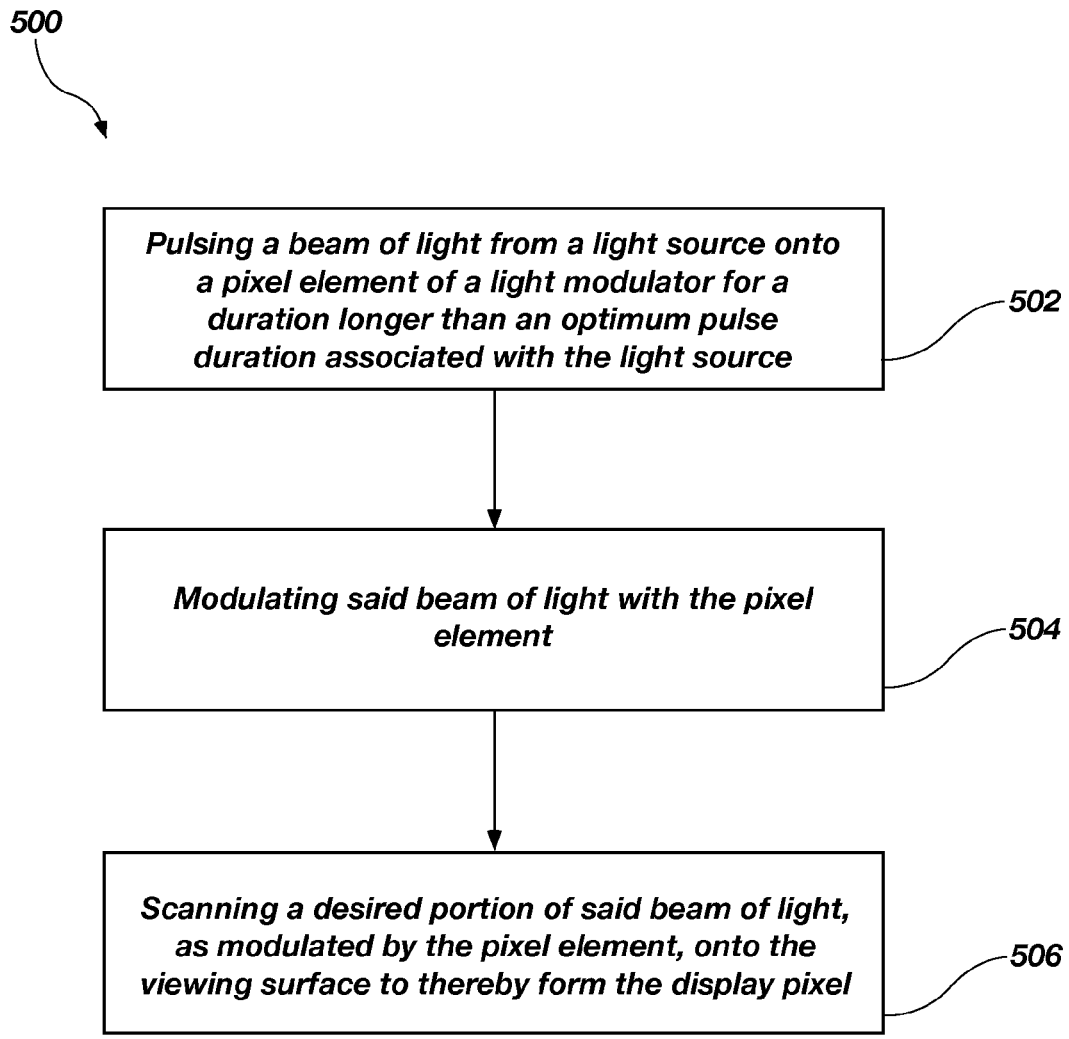
FIG. 20 depicts a high-level flow diagram of a process of displaying an image on viewing surface according to an embodiment of the present disclosure.

Referring now to FIG. 20, there is depicted a high-level flow diagram of a process 200 of displaying an image on viewing surface according to an embodiment of the present disclosure. At block 502, a projection controller may pulse beams of light from a light source onto a pixel element of a light modulator for a duration longer than an optimum pulse duration associated with the light source. At block 504, the beam of light is modulated by the pixel element. At block 506, a desired portion of the beam of light, as modulated, is scanned onto the viewing surface by a scanning device.

It will be appreciated that a column of display pixels may be arranged in any orientation on a viewing surface, including horizontally and vertically.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for generating an image on a viewing surface, said method comprising:
   (a) pulsing temporally offset beams of light onto a pixel element of a light modulator during a pixel-scan period for a display pixel;
   (b) causing each of the temporally offset beams of light to be out of focus on said pixel element;
   (c) modulating said temporally offset and out of focus beams of light with the pixel element; and
   (d) scanning a desired portion of said temporally offset beams of light, as modulated by the pixel element, onto the viewing surface to thereby form the display pixel.

2. The method of claim 1, wherein step (d) comprises scanning the temporally offset beams of light, as modulated by the pixel element, to spatially offset locations on the viewing surface.

3. The method of claim 1, wherein step (d) comprises scanning the temporally offset beams of light, as modulated by the pixel element, with a moving reflective member.

4. The method of claim 1, wherein step (a) comprises pulsing each of the temporally offset beams of light from a unique light source.

5. The method of claim 1, wherein step (a) comprises pulsing each of the temporally offset beams of light for a duration less than about 50% of the pixel-scan period.

6. The method of claim 1, wherein step (a) comprises pulsing each of the temporally offset beams of light for a duration less than about 40% of the pixel-scan period.

7. The method of claim 1, wherein step (a) comprises pulsing each of the temporally offset beams of light during non-overlapping time intervals of the pixel-scan period.

8. The method of claim 1, wherein step (a) comprises pulsing at least three temporally offset beams of light during the pixel-scan period.

9. The method of claim 1, wherein step (a) comprises pulsing temporally offset beams of light of a same color onto the pixel element of the light modulator during the pixel-scan period for the display pixel.

10. The method of claim 1, wherein step (c) comprises modulating said temporally offset beams of light using diffraction.

11. The method of claim 1, wherein die pixel element comprises at least two deflectable and elongated elements.

12. The method of claim 1, wherein said pixel element forms part of a one-dimensional array of pixel elements on the light modulator.

13. The method a claim 1, further comprising collimating each of the temporally offset beams of light in a second direction prior to said pixel element.

14. A method for generating an image on a viewing surface, said method comprising:
   (a) scanning modulated light from a one-dimensional array of pixel elements on a light modulator to thereby form a first frame of an image on the viewing surface;
   (b) scanning modulated light from the one-dimensional array of pixel elements on the light modulator to thereby form a second frame of an image on the viewing surface; and
   (c) offsetting spatially the first frame and the second frame on the viewing surface, wherein the step of offsetting spatially the first frame comprises initiating a scan of the first frame when a scanning device is at a first position of a sweep of the viewing surface and initiating a scan of the second frame when said scanning device is at a second position of a sweep of the viewing outface.

15. The method of claim 14, wherein step (c) comprises offsetting the first frame and the second frame by less than one pixel width.

16. The method of claim 14, wherein step (c) comprises offsetting the first frame and the second frame by approximately one-half of a pixel width.

17. The method of claim 14, wherein said second position is past said first position in the sweep of the viewing surface.

* * * * *